(12) United States Patent
Harvey et al.

(10) Patent No.: US 12,378,004 B2
(45) Date of Patent: *Aug. 5, 2025

(54) UAV-BASED AVIATION INSPECTION SYSTEMS AND RELATED METHODS

(71) Applicant: ULTRAVIEW AI INC., Austin, TX (US)

(72) Inventors: Jacolby Harvey, Austin, TX (US); Idan Fiksel, Austin, TX (US); Braedon O'Meara, Austin, TX (US); Sami Mian, Pittsburgh, PA (US)

(73) Assignee: ULTRAVIEW AI INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,311

(22) Filed: May 3, 2024

(65) Prior Publication Data
US 2024/0294272 A1    Sep. 5, 2024

Related U.S. Application Data

(63) Continuation of application No. 16/888,472, filed on May 29, 2020, now Pat. No. 12,006,066.
(Continued)

(51) Int. Cl.
*B64F 5/60* (2017.01)
*B64C 39/02* (2023.01)
(Continued)

(52) U.S. Cl.
CPC .............. *B64F 5/60* (2017.01); *B64C 39/024* (2013.01); *B64D 47/02* (2013.01); *B64D 47/08* (2013.01);
(Continued)

(58) Field of Classification Search
CPC ......... B64F 5/60; B64C 39/024; B64D 47/02; B64D 47/08; G01N 21/8806; G01S 17/89; G05D 1/101; G07C 5/0808
See application file for complete search history.

(56) References Cited

U.S. PATENT DOCUMENTS 9,823,658 B1   11/2017  Loveland et al.
10,109,103 B2 †  10/2018  Jenkins
(Continued)

FOREIGN PATENT DOCUMENTS

FR    3046848 B1    1/2018
WO   2016131005 A1   8/2016
(Continued)

OTHER PUBLICATIONS

European Patent Office, "Extended European Search Report," mailed Mar. 29, 2023, for European Application No. EP20812778, 10 pages.
(Continued)

*Primary Examiner* — Michael D Lang
(74) *Attorney, Agent, or Firm* — Dorsey & Whitney LLP

(57) ABSTRACT

Systems and methods for inspecting aircraft via an unmanned aerial vehicle (UAV) system are disclosed. In some implementations a system, comprises an unmanned aerial vehicle (UAV) and a computing system configured to establish a coordinate system in a space exterior to the aircraft in a global positioning system (GPS) denied environment. The system also has a controller configured to navigate the UAV along a flight path proximate to a surface of an aircraft according to the established coordinate system and a camera configured to obtain image data. A light detection and ranging (LiDAR) sensor is configured to obtain LiDAR sensor data of an inspection location on the surface to determine a presence of damage.

20 Claims, 19 Drawing Sheets

Related U.S. Application Data

(60) Provisional application No. 62/854,240, filed on May 29, 2019.

(51) Int. Cl.

| | | |
|---|---|---|
| *B64D 47/02* | (2006.01) | |
| *B64D 47/08* | (2006.01) | |
| *B64U 20/87* | (2023.01) | |
| *G01N 21/88* | (2006.01) | |
| *G01S 17/89* | (2020.01) | |
| *G05D 1/00* | (2024.01) | |
| *G05D 1/46* | (2024.01) | |
| *G07C 5/08* | (2006.01) | |
| *B64U 10/13* | (2023.01) | |
| *B64U 10/14* | (2023.01) | |
| *B64U 50/30* | (2023.01) | |
| *B64U 101/26* | (2023.01) | |
| *B64U 101/30* | (2023.01) | |

(52) U.S. Cl.
CPC ......... *B64U 20/87* (2023.01); *G01N 21/8806* (2013.01); *G01S 17/89* (2013.01); *G05D 1/101* (2013.01); *G05D 1/46* (2024.01); *G07C 5/0808* (2013.01); *B64U 10/13* (2023.01); *B64U 10/14* (2023.01); *B64U 50/30* (2023.01); *B64U 2101/26* (2023.01); *B64U 2101/30* (2023.01); *B64U 2201/00* (2023.01); *B64U 2201/104* (2023.01)

(56) References Cited

U.S. PATENT DOCUMENTS

| | | | |
|---|---|---|---|
| 2009/0051906 | A1 | 2/2009 | Carter et al. |
| 2016/0291593 | A1 † | 10/2016 | Hammond |
| 2016/0378895 | A1 | 12/2016 | Gnecco et al. |
| 2017/0031369 | A1 † | 2/2017 | Liu |
| 2017/0177937 | A1 | 6/2017 | Harmsen et al. |
| 2017/0192418 | A1 | 7/2017 | Bethke et al. |
| 2018/0003161 | A1 | 1/2018 | Michini et al. |
| 2018/0088592 | A1 † | 3/2018 | Gildner |
| 2018/0164820 | A1 † | 6/2018 | Aboutalib |
| 2018/0329433 | A1 † | 11/2018 | Zhao |
| 2019/0129039 | A1 | 5/2019 | Schubert et al. |
| 2019/0138029 | A1 † | 5/2019 | Ryll |
| 2021/0033716 | A1 * | 2/2021 | Choi ........................ F41G 3/18 |

FOREIGN PATENT DOCUMENTS

| | | | |
|---|---|---|---|
| WO | 2016203151 | A1 | 12/2016 |
| WO | 2018156991 | A1 † | 8/2018 |
| WO | 2018229391 | A1 | 12/2018 |
| WO | 2019012298 | A1 | 1/2019 |

OTHER PUBLICATIONS

U.S. Patent and Trademark Office, "PCT International Search Report and Written Opinion," mailed Oct. 14, 2020, for PCT Application No. PCT/US2020/035418, 12 pages.

S. Rady, A. A. Kandil and E. Badreddin, "A Hybrid Localization Approach for UAV in GPS Denied Areas," 2011 IEEE/SICE International Symposium on System Integration (SII), Kyoto, Japan, 2011, pp. 1269-1274, doi: 10.1109/SII.2011.6147631.†

S. Omari, P. Gohl, M. Burri, M. Achtelik and R. Siegwart, "Visual Industrial Inspection Using Aerial Robots," Proceedings of the 2014 3rd International Conference on Applied Robotics for the Power Industry, Foz do Iguagu, Brazil, 2014, pp. 1-5, doi: 10.1109/CARPI.2014.7030056.†

\* cited by examiner
† cited by third party

UAV-BASED AVIATION INSPECTION SYSTEMS AND RELATED METHODS

CROSS REFERENCE TO RELATED APPLICATIONS

This application is a continuation of U.S. patent application Ser. No. 16/888,472, entitled "UAV-BASED AVIATION INSPECTION SYSTEMS AND RELATED METHODS" filed May 29, 2020, now U.S. Pat. No. 12,006,066, issued on Jun. 11, 2024, which claims priority to and benefit of U.S. Provisional Patent Application No. 62/854,240, entitled "UAV-BASED AVIATION INSPECTION SYSTEMS AND RELATED METHODS," filed on May 29, 2019, the entire contents of all of which are hereby incorporated herein by reference.

FIELD

Implementations of drone-based aviation inspection systems and related methods relate to systems and methods for inspecting aircraft. Particular implementations also include systems and methods for inspecting aircraft for damage.

BACKGROUND

Conventionally, inspection of the exteriors of aircraft has been done using lifts and raised stairways on which inspectors gain various views of an aircraft and then visually inspect the aircraft for damage or compliance with various design standards or regulations. This process requires the inspectors to move the lifts and/or raised stairways around the aircraft while conducting the inspection, which is labor-intensive and time consuming. Furthermore, lighting in a hangar or outdoor area where the examination is being done may make it very difficult to visually inspect certain areas of the aircraft. Also, defects, such as delamination, may not be visible to the human eye as the defect lies below the surface of the aircraft.

While the human inspector may be able to take photographs of the various inspection locations and prepare a report that includes these photographs, the human inspector is limited with respect to how closely and accurately the photographs can be taken and how good the images are by the vantage point accessible via the lift or raised stairway. Furthermore, because photographs may only be taken if a particular inspector deems damage observed to be "critical," the consistency of whether damage is actually photographed depends on the preference of each individual inspector. Finally, because the inspections are done by people who are physically present, there is no other way to conduct the inspection absent the physical presence of a trained and/or certified inspector, which can cause significant downtime for the aircraft as it waits for an inspector to be available for a scheduled or unscheduled inspection to be completed.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Systems and methods for aviation inspection using unmanned aerial vehicle (UAV) systems are disclosed. In some implementations a system, comprises an unmanned aerial vehicle (UAV) and a computing system configured to establish a coordinate system in a space exterior to the aircraft in a global positioning system (GPS) denied environment. The system also has a controller configured to navigate the UAV along a flight path proximate to a surface of an aircraft according to the established coordinate system and a camera configured to obtain image data. A light detection and ranging (LiDAR) sensor is configured to obtain LiDAR sensor data of an inspection location on the surface to determine a presence of damage.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from foregoing and following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the generally description given above and the detailed description of the preferred embodiments given below serve to explain and teach the principles described herein.

FIGS. 9A-9H are illustrations of exemplary graphical user interfaces for an application for inspecting aircraft.

DETAILED DESCRIPTION

Figure 1:
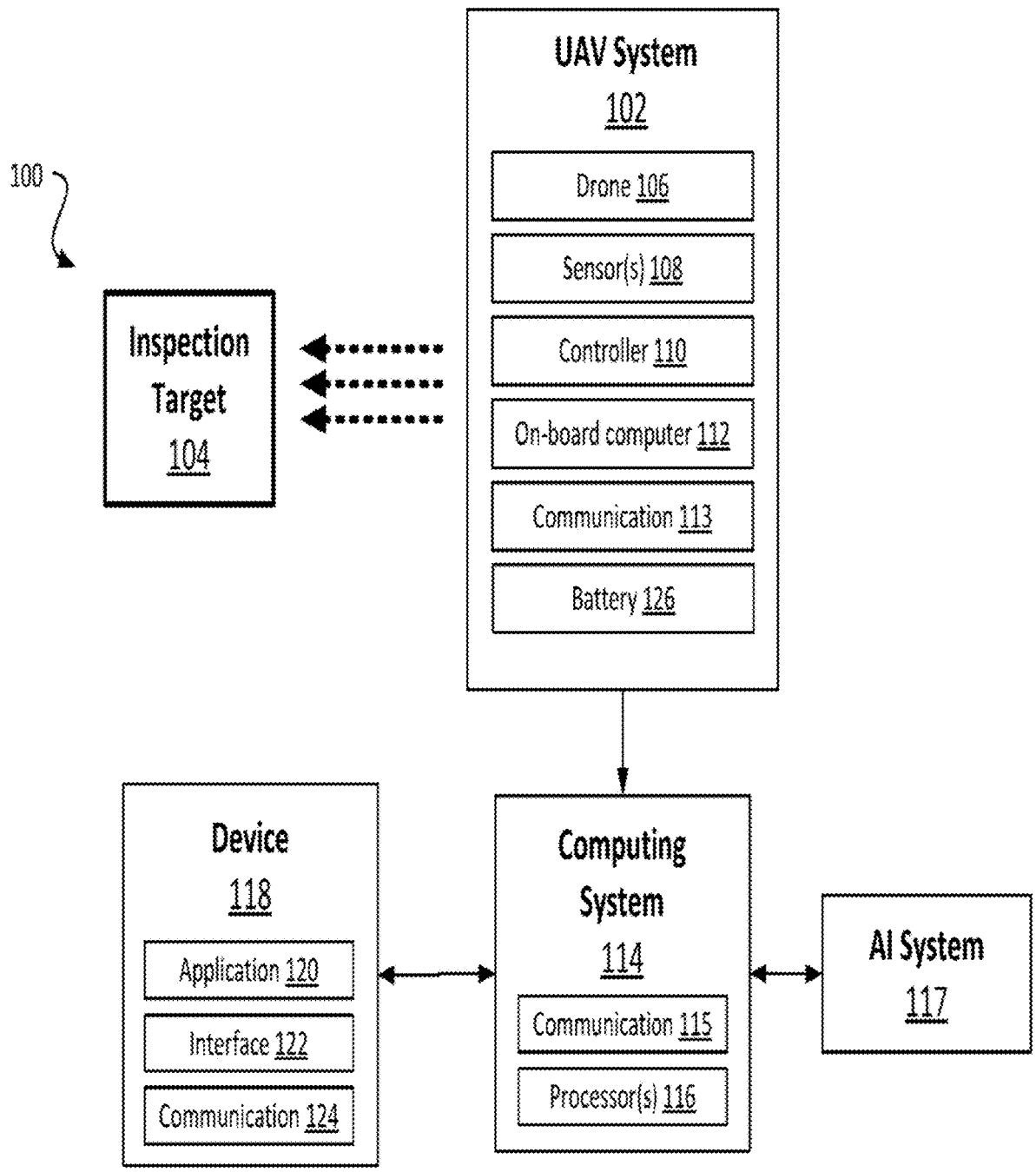
FIG. 1 illustrates a diagram of an exemplary UAV-based aviation inspection system.

While the present disclosure is subject to various modifications and alternative forms, specific embodiments thereof have been shown by way of example in the drawings and will herein be described in detail. The present disclosure should be understood to not be limited to the particular forms disclosed, but on the contrary, the intention is to cover all modifications, equivalents, and alternatives falling within the spirit and scope of the present disclosure.

Systems and methods for aviation inspection using UAV systems are disclosed. The exemplary systems and methods described herein may be used for or customized for other large vehicles, machinery, or buildings including, but not limited to, trains, ships, oil rigs, power plants, water towers, etc. The exemplary systems and methods described herein are also well suited for the inspection of the interior of aircraft, ships (e.g., freighters with large hulls), oil rigs, power plants, water towers, etc. where there is limited or no GPS signal access. The exemplary systems and methods described herein are also well suited for the inspection of the subsurface layers of aircraft, ships (e.g., freighters with large hulls), oil rigs, power plants, water towers, etc. where visual inspections are not possible. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details.

Measurements, sizes, amounts, etc. may be presented herein in a range format. The description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as 10-20 inches should be considered to have specifically disclosed subranges such as 10-11 inches, 10-12 inches, 10-13 inches, 10-14 inches, 11-12 inches, 11-13 inches, etc.

Inspection Systems Overview

Various systems and methods utilizing UAVs (also referred to as drones) adapted to perform automated data acquisition, analysis, and storage of images for an aircraft inspection are disclosed herein. These exemplary systems and methods can enable an inspector to complete an inspection in any location, e.g., by being physically present near the aircraft or remote from the aircraft. In various implementations, the systems and methods permit automated identification and/or determination whether damage exists or an inspection location is in compliance using a machine learning aided process.

Referring to FIG. 1, a block diagram 100 of a UAV-enabled aircraft inspection system (UAS) is illustrated. As illustrated, the system 100 includes UAV system 102 configured to fly around an inspection target 104 (e.g., aircraft) being inspected and automatically acquire data at each of a plurality of inspection locations around the surface of the aircraft 104. The exemplary UAV system 102 can include a drone 106, one or more sensors 108, a controller 110, a computing system 112 and/or a communication system 113. The data from each of the plurality of inspection locations can be transmitted/shared with a remote computing system 114 (e.g., for processing by processor(s) 116). The data may be transmitted to an artificially intelligent (AI) system 117 (also referred to herein as a machine learning system), which may be internal or external to the remote computing system 114. The remote computing system 114 can be coupled with a device 118 configured to be accessed and/or operated by a user. For example, the communication system 115 of the remote computing system 114 can be coupled to the communication system 124 of the device 118. The device 118 may be operating an application 120 for facilitating the inspection process, as further discussed below. In various implementations, the user is an aviation inspector who views at least a portion of the data from the plurality of inspection locations in an interface 122 generated on the device 118 and validates, confirms, and/or completes the inspection process.

In various system and implementations disclosed herein, the UAV system 102 may carry out the inspection inside a hangar or other structure which is made partially or fully of metal. In such an environment, no global positioning system (GPS) signals may be able to penetrate into the interior of the structure at a sufficient strength to be readable by a GPS sensor device. This is referred to herein as a GPS-denied environment. Because of this, if the UAV system 102 is required to operate within a hangar, autonomous or semi-autonomous operation using GPS data may be impossible. In other implementations, the UAV system 102 may carry out the inspection outside a hanger or other structure where GPS signals are available and may use GPS data as part of autonomous or semi-autonomous operation. However, even where the UAV system 102 is asked to operate outside a GPS-denied environment, the use of GPS data to carry out the inspection of the aircraft may require to use of a very high precision GPS sensor, which may be cost prohibitive, meaning that the UAV system 102 may need to rely primarily on the system and methods disclosed herein to carry out at least a majority of the inspection.

Furthermore, satellite signal availability may make it difficult to sustain 24/7 inspection operations needed to keep aircraft running on a schedule. This situation may be particularly acute for smaller aircraft (as compared to larger commercial passenger airliners) being inspected. Because the aircraft is smaller, higher precision GPS data may be required to enable an inspection to be carried out accurately and repeatably.

While the subject will be dealt with in greater detail later in this document, the computing system 106 may be a server, group of servers, a web server, a database server, a collection of web servers, a collection of database servers, or a cloud computing environment. The UAV system 102 may transmit and/or transfer the data collected during the inspection flight in real time during flight, partially in real time during flight, and/or after the flight is completed using wired or wireless data communication channels utilizing any one or more of a wide variety of telecommunication protocols, including, by non-limiting example, Wi-Fi, Bluetooth, Zigbee, Ethernet, UHF, VHF, serial communication, radio, or any other telecommunication protocol type. The device on which the application system 108 is operating may be a portable computing device, a laptop, a notebook computer, a tablet, a smartphone, a smart watch, smart glasses, a smart headset, a fixed computing device, a desktop, a server, or any other computing device type capable of displaying at least a portion of the data collected during the inspection in the interface. Each of these components, including the UAV system 102, along with various implementations will be disclosed in greater detail in this document.

Unmanned Aerial Vehicle (UAV) Systems

Figure 2:
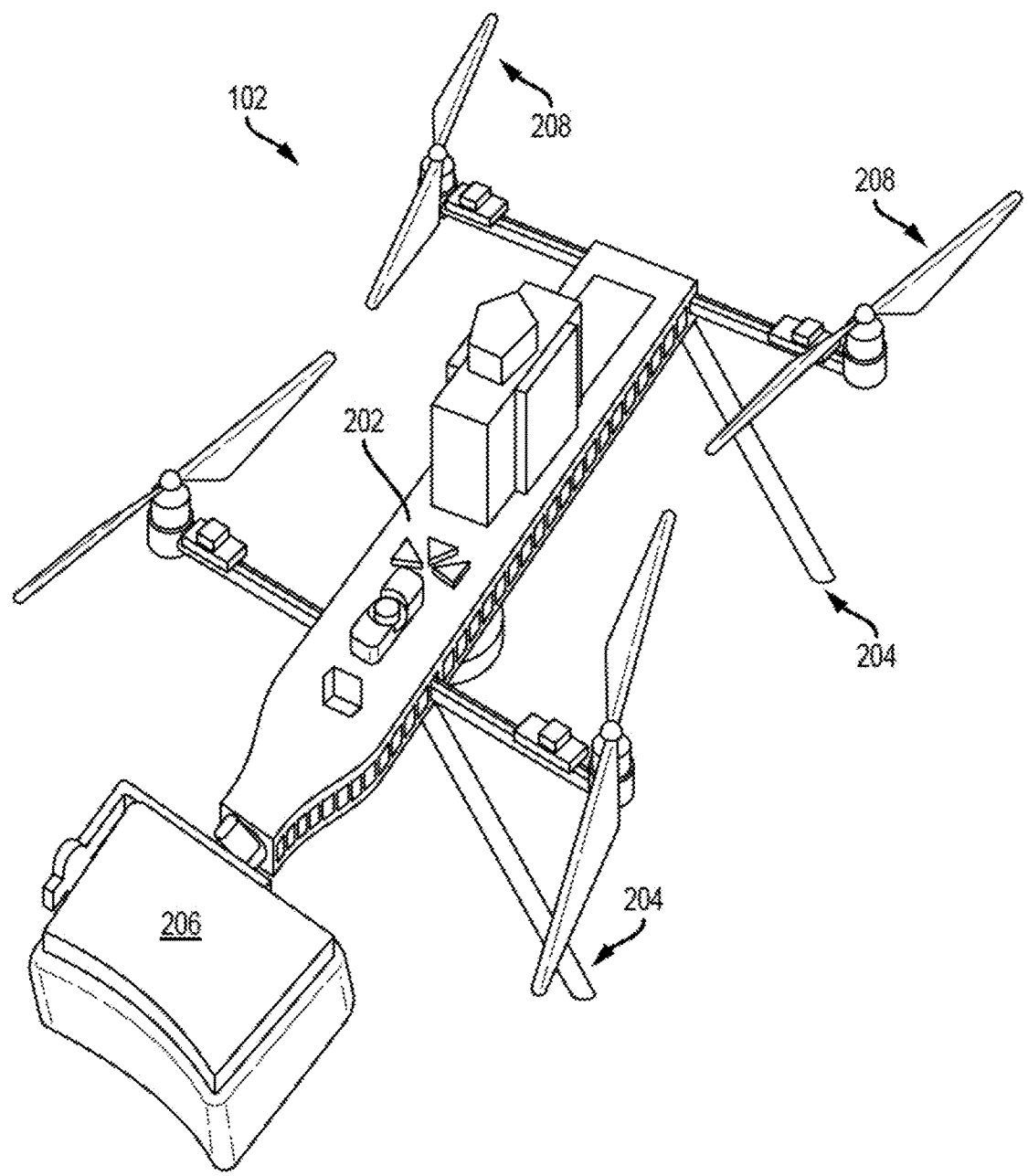
FIG. 2 illustrates an exemplary UAV system configured to inspect aircraft.

Various UAV system 102 configurations may be utilized in the various system implementations. A non-limiting example of a UAV system 102 is disclosed in this document. Referring to FIG. 2, the illustrated UAV system 102 includes a body section 202 with a plurality of supporting legs 204 coupled thereto used to support the UAV system 102 when it is resting on the ground. Coupled at an end of the body section 202 is a gimbal assembly 206 capable of moving independent from the body 202. A UAV controller module is coupled to the body 202 which governs the various propulsion and gimbal operations. One or more batteries or other power sources can be coupled to the body 202 and electrically coupled with the gimbal assembly 206 and/or the motors driving the propellers 208 attached at the end of the motor support arms.

In a particular implementation, the UAV system 102 may have 18.5 inch propellers mounted to 4014 380 kV motors. The four motors and propellers are capable of generating 15 pounds of thrust at 50% throttle, enabling the UAV system 102 to hover or fly at an average speed of 3 MPH for approximately 18-20 minutes.

In various implementations, the gimbal assembly 206 has two axes of rotation (e.g., X axis and Y axis) in which rotation in each axis is controlled by a separate control motor. An exemplary gimbal motor may be configured to handle a load of approximately 0.8 kg/4 S or 0.8 kg/14.8 V.

Figure 3:
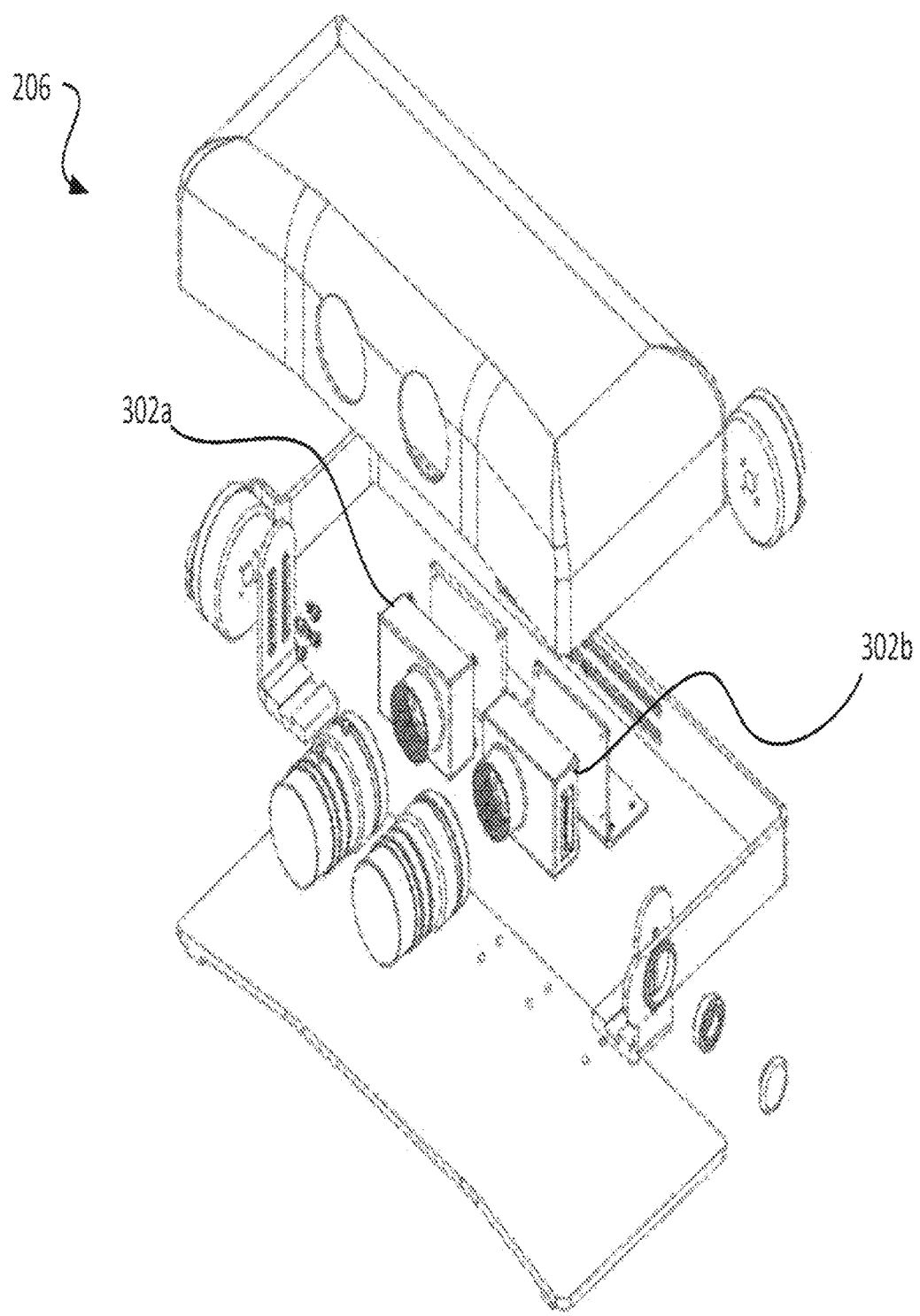
FIG. 3 illustrates an exemplary sensor system for inspecting aircraft.

FIG. 3 illustrates an exploded view of an exemplary gimbal assembly 206, including the control motors and related hardware enabling the rotation in the X and Y axes. In this example, the gimbal assembly 206 is coupled to a sensor package that includes two sensors 302a, 302b (collectively referred to as 302), e.g., a camera sensor and a light detection and ranging (LiDAR) sensor. FIG. 2 illustrates a gimbal assembly 206 coupled to a sensor package that has four sensors 302.

A wide variety of sensor types may be employed in the sensor package 302 controlled by the gimbal assembly 206 in various system implementations, such as, by non-limiting example, camera sensors, LiDAR sensors, stereoscopic cameras, infrared cameras, white light sensors, white light depth sensors, digital light processing (DLP), white light projecting, thermal sensors, and any other sensor type useful in conducting aviation inspection. In a particular implementation, a camera sensor with a 1 inch sensor size and a resolution of 4096×2160 pixels is used. Each pixel has a size of 3.45×3.45 microns. The frame rate of the camera sensor may be up to 48 frames per second (fps). The camera may communicate with a data acquisition/storage module in the sensor package 302 or on board the body 202 of the UAV system 102 via a USB 3.0 connection and have an operating voltage of 5 V. In a particular implementation, the LiDAR sensor has 16 channels with a field of view (FOV) of +/−16 degrees capable of capturing 327,680 points/second. The LiDAR sensor via a pluggable connector with power, data, and digital input/output operates at between 22.5-27 V at 1.5 A.

Additional sensor types can be included. Infrared sensors may be used to detect delamination of materials at the inspection locations. Stereoscopic camera systems and/or white light depth sensors may be used to detect and/or measure the depth of surface damage at inspection locations. The depth measurement technology may be cross-referenced or compared with image data to confirm damage to a section of the aircraft 104. A wide variety of sensor designs and combinations of sensors may be employed in various system implementations.

The UAV controller system 110 in various implementations may include, by nonlimiting example, one or more processors, one or more inertial measurement units (IMUs), a barometer, a magnetometer, a GPS sensor, a radio transceiver, and any other flight control/management sensor/module. In a particular implementation, the flight controller 110 is one marketed under the tradename PIXHAWK 4 by Auterion AG of Zurich, Switzerland containing two processors: an STM32F765 central processor and an STM32F100 coprocessor both marketed by STMicroelectronics of Geneva, Switzerland. The exemplary controller 110 also includes two IMUs: an ICM-20689 marketed by InvenSense/TDK of Tokyo, Japan, and a BMI055 marketed by Bosch Sensortec GMBH of Reutlingen, Germany. The exemplary flight controller 110 also includes a barometer and a magnetometer. A GPS/GLONASS sensor is coupled with the flight controller 110 in conjunction with a magnetometer. A current sensor capable of handling 120 A is also included in this particular implementation. An exemplary flight controller 110 may require a maximum operating voltage of 6 V. The radio transceiver is a 915 MHz UHF telemetry system capable of transmitting real-time data observations.

In various implementations, the UAV system 102 may include various on-board computing modules 112 that include various processor types, operating systems, memory types, and input/output capabilities. Examples of the on-board computing modules 112 that may be utilized in various implementations include, by non-limiting example, single board computers marketed under the tradename ARDUINO by BCMI of Italy; single board computers marketed under the tradename RASPBERRY PI by Raspberry Pi Foundation of Cambridge, UK; microprocessor boards marketed under the tradename JETSON TX2 by Nvidia Corporation of Santa Clara, Calif.; and other open and/or closed source single board computing systems. In various other implementations, however, a custom fabricated microprocessor board may be utilized and, in some implementations, a board may not be used and the functions of the on-board computing module 112 may be performed by a packaged application-specific integrated circuit (ASIC). The function and/or capabilities of the on-board computing module 112 depends on the amount of data processing conducted on the UAV system 102 during a flight compared with the amount of data processing to be conducted using the remote computing system 114 following and/or during the flight.

In a particular implementation, the computing module 112 includes Nvidia's Jetson TX2 single board computer. The Jetson utilizes a Pascal GPU with 256 cores and a maximum clock rate of 1.12 GHz. The Jetson uses an ARM v8 64-bit heterogeneous multiprocessing CPU architecture including six processor cores and two CPUs, the Nvidia Denver Dual-core 2 GHz processor and an ARM Cortex-A57 Quad-core 2 GHz processor. The Jetson TX2 has 8 GB of RAM and 32 GB of on-board eMMC Flash Storage; a 128 GiB SSD supplements this and is mounted to the Auvidea J120 carrier board. The on-board WLAN card/radio can transmit data up to 3 M/s, and an ethernet port is provided by the carrier board to offer 10/100/1000 BASE-T Ethernet connection. The computing module 112 can operate with a power draw between 7.5 W and 15 W with an input voltage of 7V to 17V specified separately from the power consumption by the carrier board. The carrier board also provides two USB-A ports; one 3.0 and one 2.0; one 4-lane CSI-2 connector; one I2S digital audio connector; one SCI/I2C, two UART, and two CAN busses. These various components of the computing module 112 may be used in various implementations to conduct both on-board processing of data and preprocessing of data for storage for later processing after the UAV system 102 has completed its inspection.

In various implementations, the UAV system 102 utilizes a battery 126 to provide power to one or more of the sensors, processors, motors, and other devices before, during, and/or after flight. The battery 126 may be a lithium battery or lithium polymer battery in various implementations. In a particular implementation, a lithium polymer battery with 6 cells and a capacity of 14 A with a maximum 10 C discharge rate and 5 C charge rate may be used to supply power for a flight time of 20 minutes. In some implementations, the UAV system 126 utilizes a lithium polymer battery having a capacity of at least 17 A for a flight time of approximately 20 minutes.

In a particular implementation, a lithium polymer battery with 6 cells and a capacity of 16 A with a maximum 15 C discharge rate and 5 C charge rate may be used to supply power for a flight time of 17 minutes. In some implementations, the UAV system 126 utilizes a high voltage (e.g., 26.2 V) lithium polymer battery having a capacity of at least 17 A for a flight time of approximately 20 minutes.

In some implementations, the UAV system 102 includes a voltage sensor or voltage monitor coupled to a battery 126. The voltage monitor may monitor the voltage of the battery before, during, and/or after the flight of the UAV system 102. In some implementations, the voltage monitor is configured to monitor the voltage in one or more cells of the battery 126 (e.g., 2 cells, 4 cells, 6 cells) to ensure that the voltage across the cells are the same or similar. By maintaining the same or similar voltage across the cells of the battery 126, the voltage monitor can prevent potential harm (e.g., fire, explosion, etc.) in the battery 126. The voltage monitor may be coupled to a computing system 112 and/or controller 110 of the UAV system 102. If the voltage monitor senses an irregularity or dangerous condition in the battery 126, it may signal to system 112 or controller 110 to safely land or return the UAV system 102 to the home base. Similarly, the voltage monitor may determine that the battery 126 is low and needs to be recharged before continuing the inspection.

Implementations

Aviation inspection processes are supported and carried out with the UAV system 102 using various navigation, positioning, data acquisition, and/or data processing methods. These various implementations will be discussed in turn.

Positioning Processes

Figure 4:
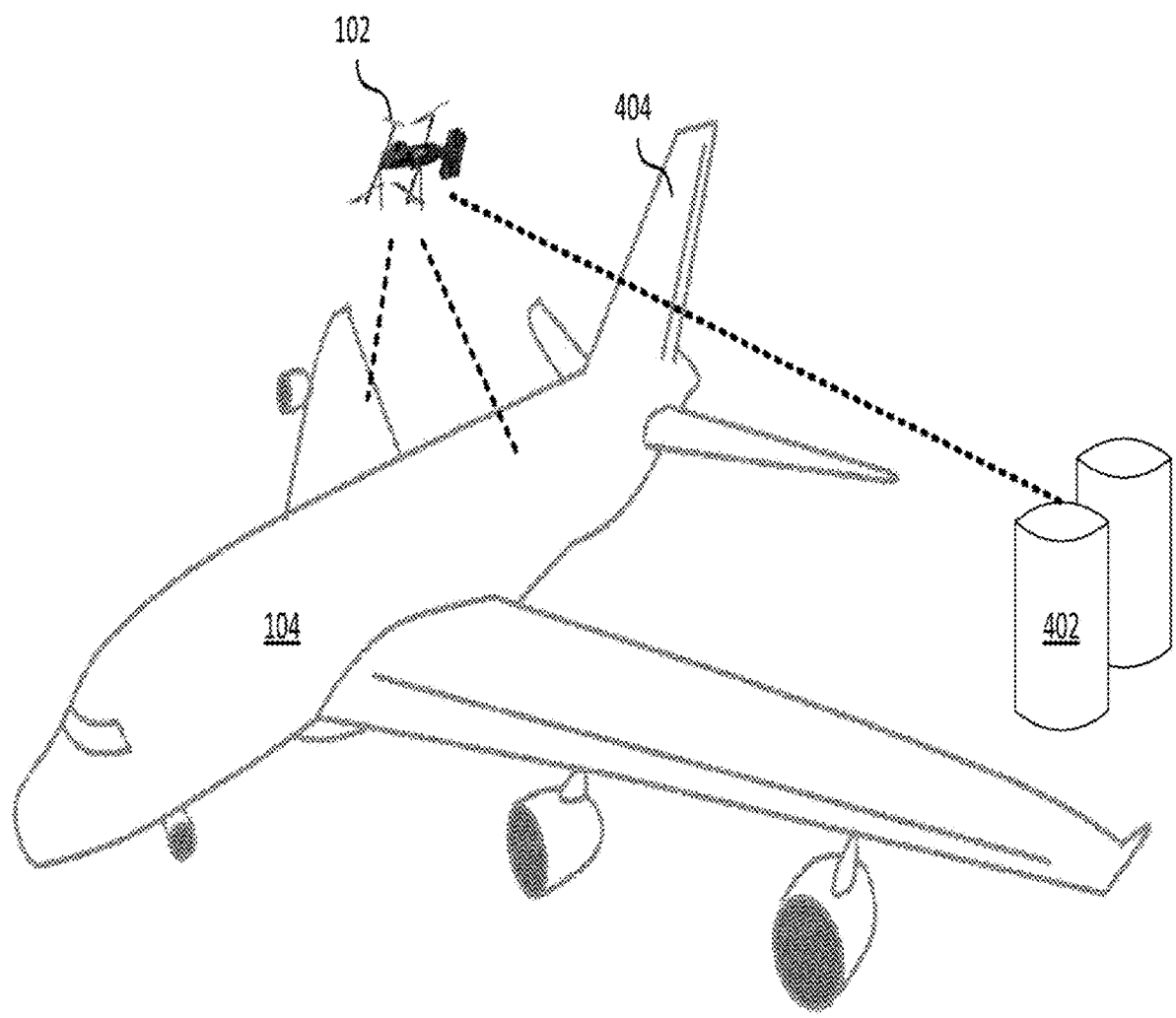
FIG. 4 illustrates an exemplary UAV system inspecting an aircraft.

FIG. 4 illustrates an exemplary UAV system operating within a space including an aircraft 104 and one or more objects 402. In some implementations, at the beginning of operations, the on-board computing system 112 and/or the remote computing system 114 may establish the position of the UAV system 102 relative to the aircraft 104 and other objects 402 in the airspace in which the UAV system 102 is operating. Because the UAV system 102 may be operating in a GPS denied environment during an inspection in a hangar, the UAV system 102 is configured to establish a coordinate system in the space around the aircraft 104 so that the space can be navigated to the specific inspection locations around the aircraft's surface. In various implementations, the implementations involved in the positioning system for the UAV system 102 are agnostic to any navigation decision-making that may occur after completing the inspection process. The exemplary methods may be executed to provide a layer of abstraction and/or a set of coordinates within the space around the aircraft 104. In various implementations, the navigation system is part of or external to the controller 110 of the UAV system 102. The output of the positioning methods of the positioning system may be a coordinate system. In some implementations, the coordinate system is a Cartesian coordinate system around the target (e.g., aircraft 104). In some implementations, the coordinate system includes X and Y axes defined in polar coordinates and a Z-axis of incremental values around the target (e.g., body of the aircraft 104 being inspected). The coordinate system may be unique to a particular aircraft identified by its tail number, unique to a particular model of aircraft (e.g., Boeing 777), unique to a combination of aircraft and inspection environment (e.g, aircraft and hangar), etc. Additionally, in various implementations, the positioning system methods maintain the position of objects 402 within the coordinate system, including, by non-limiting example, the UAV system 102, static obstacles, dynamic obstacles, light origins, and the body of the aircraft 104.

Figure 5:
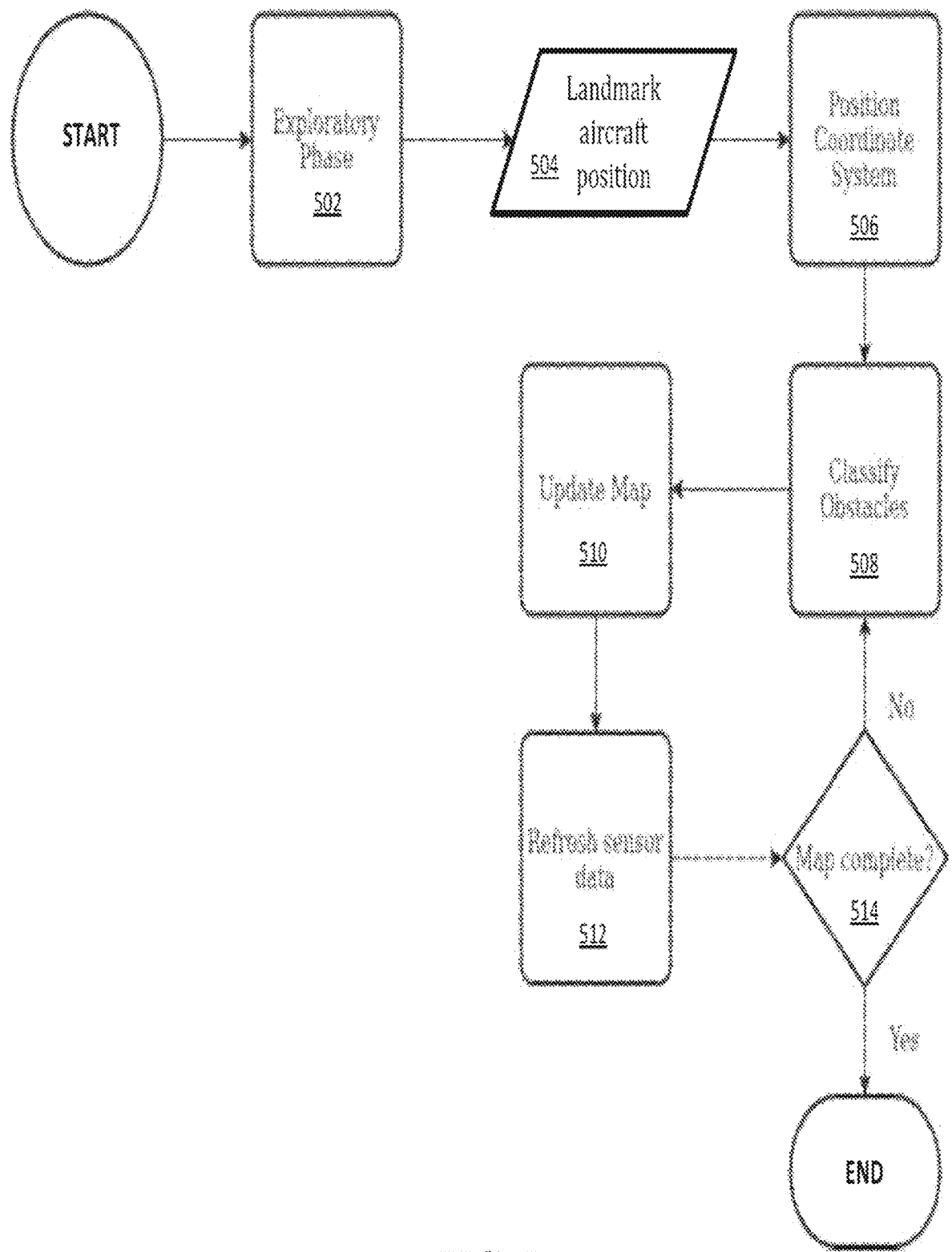
FIG. 5 is a flowchart of an exemplary method for generating a map for inspecting aircraft.

Referring to FIG. 5, in a particular implementation of a method of positioning and forming a coordinate system for a UAV system 102, the creation of the coordinate system begins with the UAV system 102 entering an exploratory phase 502. The output of the processes performed during the exploratory phase 502 is to locate static obstacles which can become landmarks, including the aircraft 104 body.

In various implementations, it is beneficial to identify the aircraft 104 body as a landmark 504 during this phase 502 otherwise a fatal error is triggered (causing the UAV system 102 to cease flying operations). In various implementations, the aircraft 104 body is the reference point for the origin of the coordinate system. During the carrying out of the exploratory phase 502, the UAV system 102 holds a hovering state for a short time while the LiDAR sensor and/or camera sensor 302 obtain image data. This image sensor data can be processed by the on-board computing module 112 to obtain the location of static obstacles. Some exemplary implementations of the exemplary exploratory phase 502 are further described below (e.g., as part of exploratory phase 602).

In some implementations, the UAV system 102 can use the aircraft 104 (e.g., fuselage) to maintain a stable position and/or as an aid in identifying one or more fixed points during the exploratory phase 502. In some implementations, the bounds and/or location of the base station (which is in communication with the UAV system 102 during its flight) is used to maintain a stable position and/or as an aid in identifying one or more fixed points during the exploratory phase 502. The initially collected fixed point data may help the UAV system 102 navigate into a second stable hover position. Although optional, in this position the UAV system 102 repeats the data acquisition and processing methods until the system indicates that enough static obstacles have been detected for the system to identify when a landmark it has selected is a dynamic obstacle. In some implementations, the UAV system 102 is configured to update the map with one or more probabilities of an obstacle being dynamic or static. If the probability that an obstacle is static decreases significantly (e.g., by 10% or more, by 20% or more, by 30% or more, etc.), the object may be designated as dynamic. In various implementations, during the exploratory phase 502, a certain amount of data is collected and/or processed (e.g., greater than a pre-determined threshold). In some implementations, the amount of data collected and/or processed is such that the UAV system 102 is able to determine the origin of the aircraft 104 relative to the UAV system 102 position. In some implementations, the amount of data collected and/or processed is such that a specific number of landmarks can be identified on the surface of the aircraft 104 itself to continue to the next phase (tail, nose, wingtips, etc.). In various implementations, the positioning system methods may store the non-aircraft landmarks identified in this phase 502 that are located around the aircraft 104 for potential use in the verification of future runs of the system. This strategy may reduce the future time it takes to complete the exploratory phase 502 in a second run. However, where previously-collected landmark data is used, methods of verifying the presence and location of the previously-identified landmarks are carried out to ensure the process is capable of dealing with changes in aircraft position and the operational environment in the space around the aircraft 104 being inspected.

Referring to FIG. 5, following completion of the methods associated with the exploratory phase 502, the on-board computing system's 112 positioning system defines the coordinate system 506 to be used during the inspection flight in context with the locations of the landmarks identified and/or defined. In various implementations, the coordinate system's X origin is placed in line with the nose of the aircraft 104, the Z origin is placed along the axis of vertical symmetry when viewing the aircraft 104 from the front, and the Y origin is on the line that intersects with the point where the lowest part of the wing meets the aircraft body on either side. In various implementations, other points on the aircraft fuselage may be used to ensure that the coordinate system remains consistent throughout the flight.

The various positioning methods may continue to operate on the on-board computing system 112 during the navigation and/or data collection phases of the inspection flight. In various implementations, to meet the system need to maintain substantially real-time positions of the various observed objects in the environment, the positioning methods of the position system maintain a point cloud map of the environment formed by an aggregation and generalization of the points which have been observed by the LiDAR sensor 108 during the flight. The on-board computing system 112 can keep a list of the classification for each obstacle identified in the scene, the position of the UAV system 102, and the landmarks the system had used for positioning in the memory of or coupled to the on-board computing system 112.

During a flight, the LiDAR sensor data is regularly, intermittently, periodically, or continuously refreshed, resulting in the creation of a new point cloud view. In various implementations, the positioning process uses the data in the point cloud view to classify the obstacles in the view. A human figure may be easily identifiable as a dynamic obstacle based simply by the amount of data points publicly available for identifying a human during recognition training of the computing system 112. This can enable the system to immediately confirm the human figure is a dynamic obstacle during the flight. However, for each static obstacle identified, the location of the static obstacle is compared to the point cloud map originally generated during the exploratory phase 502. If the static obstacle from the new point cloud view is determined to be in a different location and most other previously identified static obstacles are in the same location, that static obstacle may be a dynamic obstacle. The present system can utilize the on-board computing system 112 to calculate the velocity of the obstacle for testing the hypothesis that the obstacle is indeed a dynamic obstacle when the LiDAR sensor captures the next point cloud view.

In various implementations, if the position of a previously identified static obstacle seems to have changed and the position of all other obstacles change, where this change is consistent with other sensor data (e.g., data from IMUS) and the direction of the flight path for the UAV system 102 that was planned, then the UAV system 102 has more than likely moved. Additionally, the UAV position in the point cloud map can be updated along with the observed position of any dynamic obstacles. As illustrated in FIG. 5, this process of collecting and processing point cloud maps using the LiDAR sensor, classifying obstacles (step 508), storing the obstacles and their position in the coordinate system and/or point cloud map (e.g., update map step 510), and then refreshing the LiDAR sensor data (step 512) is repeated until the UAV detects and/or is instructed that the map has been completed (step 514) around the aircraft 104.

If, during the processing of a new point cloud view, a static obstacle's position has shifted and it is uniform with all other obstacles' positions but not uniform with other sensor data, the map, and/or the planned flight path, then the on-board computing system 112 will detect and handle an error in the data acquisition/processing process. If a hardware error has occurred, one of the log monitors operating within the on-board computing system 112 may be able to diagnose and correct the shift, enabling the flight to continue. However, in the case of large amounts of drift error, for example, the flight may not be able to continue and the positioning system process may then need to be partially or fully re-recalibrate the coordinate system location(s) affected. Because, in various system implementations, these types of positioning errors may arise at any time, methods of messaging within the computing system may be implemented that enables the positioning system to interrupt the navigation system during a flight. In various implementations, a watchdog process/method may be used by the on-board computing system 112 to interrupt the positioning system during its operations. The watchdog process/method may be, in various implementations, a limit checker that includes manual takeover processes to allow a user to force a landing or other recovery strategy in the case that one of the on-board systems on the UAV system 102 is detected to have exceeded a limit in its operation. In some implementations, the flight errors and warnings may be logged in a system or database separate from the system or database for inspection. This is to enable inspection system calibration or to detect component (e.g., sensor 302) degradation.

Navigation Processes

Figure 6A:
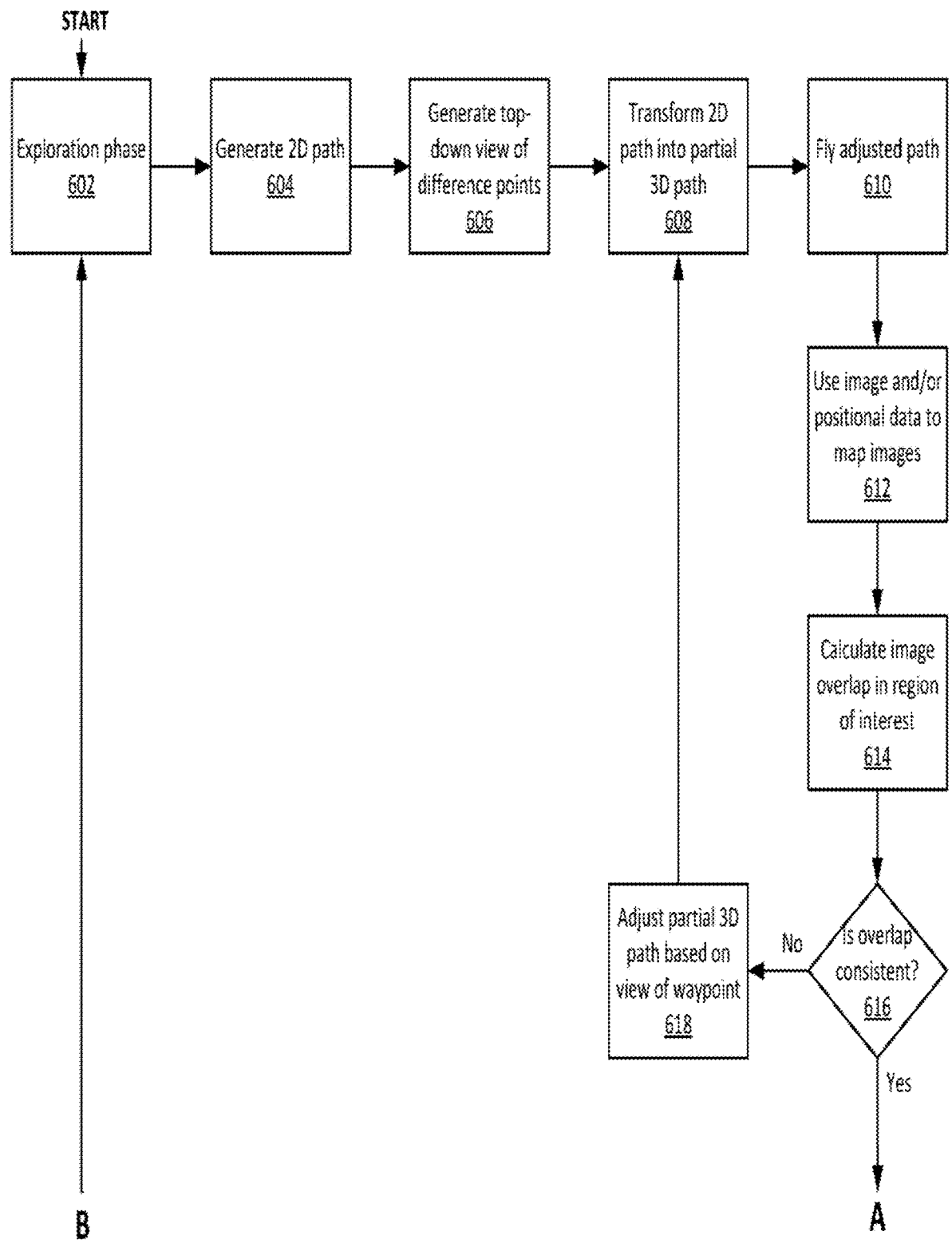
FIGS. 6A-6B are flowcharts of an exemplary method for inspecting an aircraft.
Figure 6B:
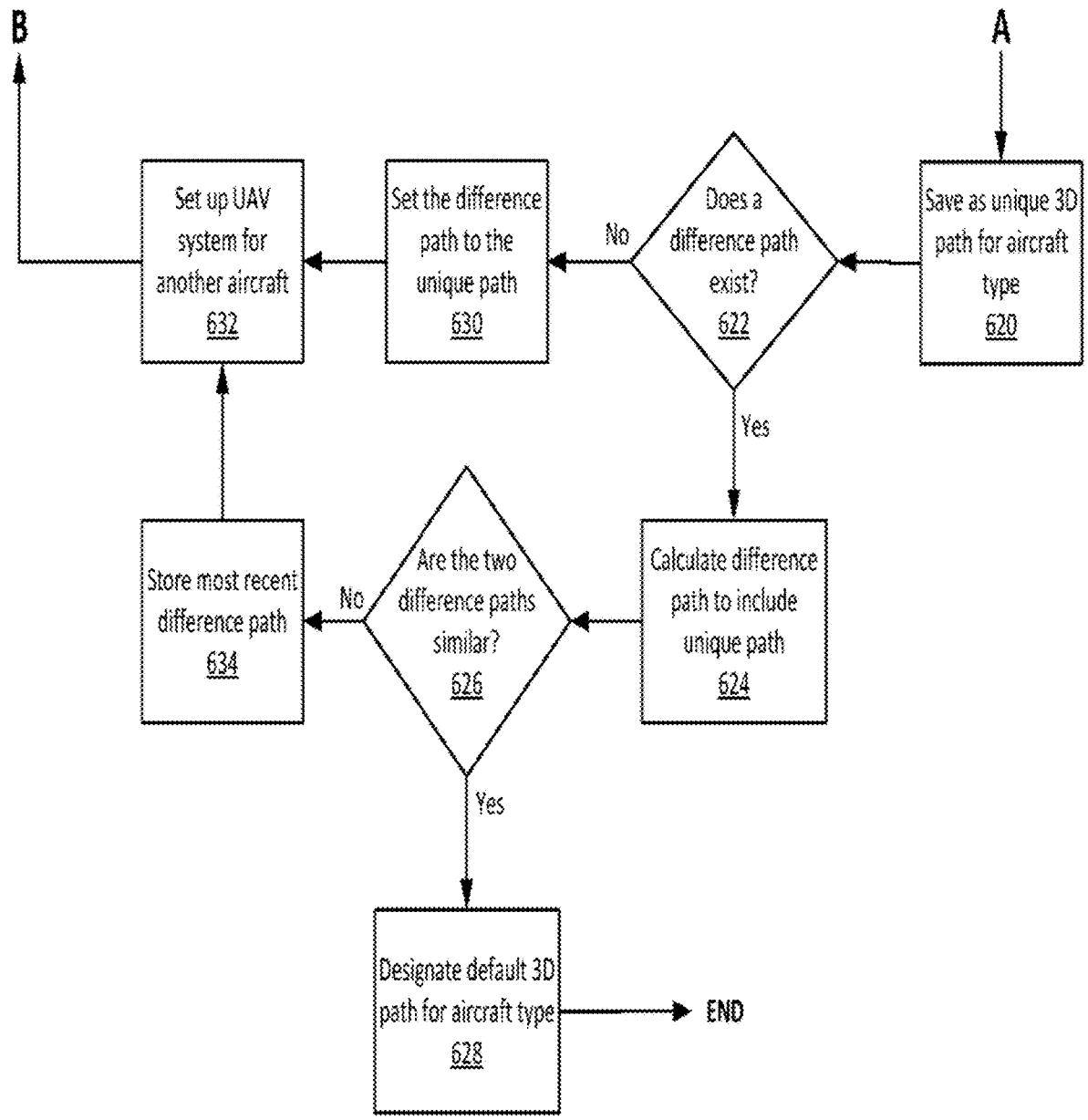

Referring to FIGS. 6A and 6B, an implementation of a process of creating, executing, and/or modifying paths used in navigating the UAV system 102 during an inspection flight is illustrated. Such implementations may use a software layer in the on-board computing system 112 that sits above the layer that executes the positioning system. Various implementations enable the UAV system 102 to navigate around a variety of aircraft 104 and, in some implementations, create paths for previously unknown aircraft 104.

In various implementations, a path is a set of waypoints which the UAV system 102 will navigate in a sequence during an inspection flight. Waypoints are points of space in the coordinate system defined by the positioning system and the attitude the UAV system 102 should attain to consider that waypoint reached. A waypoint may also have a camera angle (otherwise known as a view) if the waypoint is considered an objective and/or inspection waypoint and data is required to be captured to satisfy that particular waypoint.

A path may also have conditional waypoints called exit waypoints, which may enable more complex return-to-home behavior if the navigation system is not the reason for the stoppage and/or return of the UAV system 102 to home (e.g., the charging pad for the UAV system 102). Reasons for stoppage may include objects (e.g., static or dynamic objects) in the path of the UAV system 102, hardware malfunction, software malfunction, etc. Complexity may be introduced to the return-to-home process because a safe route back to the starting position (or another position) needs to be determined (e.g., by computing system 112 or 114). The UAV system 102 may be unable to retrace its flight path due to new blocking objects. If the UAV system 102 experiences a malfunction, the controller 110 may force a landing of the UAV system 102. A deadzone is a region in which a waypoint cannot exist. For instance, a deadzone may exist due to a physical obstacle being present or the existence of an abstract obstacle, e.g., glare from a light source.

In various implementations, the on-board computing system 112 may automatically or semi-automatically create paths. In other implementations, the paths may be created via interaction by the user of the UAV system 102 itself (e.g., via application 120). As a first step in an implementation of a method of creating a path for a UAV system 102 for use during an aviation inspection, a default path is created. The default path may be different for each aircraft type and can be created prior to beginning a flight to collect damage data on any given type of aircraft. Referring to FIG. 6A, in some implementations, a path creation routine starts with an exploration phase 602 in which the UAV system 102 navigates around the nearest aircraft fuselage 104, collecting a sparse point cloud of the surface using the LiDAR sensor of the UAV system 102, and processing the data using the on-board computing system 112 using computer vision techniques to extract the points belonging to the aircraft 104 in each view and to aggregate those points into one point cloud. In some implementations, the exploration phase includes one or more steps or aspects of the exploratory phase 502. Using these techniques, the computing system 112 can detect the position of the aircraft 104 and localize it in the map (e.g., 3D map) being created. In some implementations, the individual scans in creating the sparse point cloud may be processed to filter out background particles (e.g., using computer vision and/or pattern matching techniques). These may be aggregated into a single model (e.g., a 3D model) for path planning. The single model may be augmented with visual photogrammetry to develop more dense point clouds and, ultimately, vertices as more data is collected on a new aircraft type. In some implementations, one or more flight paths or specific points of interest for the UAV system 102 may be generated based on a 3D model of the aircraft 104. In some implementations, these flight paths or points of interest may be stored in a memory of the UAV system 102. In various implementations, during the exploration phase 602, the UAV system 102 may be manually, semi-manually, or automatically controlled during the flight.

In some implementations, after the exploratory phase 602 is complete, the computing system 112 is configured to resolve the coordinate system with the point cloud map. The UAV system 102 may be localized relative to the aircraft 104 to be inspected. The aircraft 104 may be populated into the map as a result of the exploratory phase 602 or loaded from memory. In some cases, loading a preexisting model of the aircraft type from memory may reduce the time required for the exploratory phase 602. In some cases, the computing system 112 may receive or create as inputs a set of waypoints to generate the flight path. The waypoints may be generated based on the regions of interest (ROI) on the aircraft 104. These waypoints may be received from a user of the application 120 (e.g., in list form). Alternatively, the computing system 112 may receive an instruction to take images of one or more parts of the aircraft 104. The computing system 112 may then plot a flight path based on the received waypoints or instruction. In some implementations, the system 112 may attempt to cover all waypoints in the same flight path. In some implementations, the system 112 may attempt to create the most effective flight path for the UAV system 102.

In some implementations, with the point cloud data, either during the same flight or a subsequent flight, the on-board computing system 112 uses the dimensions of the aircraft 104 (e.g., automatically measured from the point cloud or manually inputted by the user based on prior knowledge about the aircraft 104) to create a flight path 604 in a 2D plane over the aircraft 104 excluding the vertical stabilizer 404. This 2D flight path (initial path) may be set at a height relative to the aircraft 104 that allows for the correct overlap in the region of interest (e.g., the aircraft fuselage) for the highest point on the aircraft fuselage. Next, in step 606, during a flight, the UAV system 102 can capture a view of the collected sparse 3D model from the top to create top-down views of the aircraft. The UAV system 102 may represent each point as the difference between the highest point in the 3D model, excluding vertical stabilizer 404, and the UAV system 102 itself. In some implementations, the 3D map can be used for planning or as an input to a simultaneous localization and mapping (SLAM) algorithm.

In some implementations, in step 608, the 2D path is summed with this difference matrix of points to generate a 2.5D path (also referred to as the difference path or partial 3D path). In step 610, during an inspection flight, the UAV system 103 may navigate along the 2.5D path capturing both point cloud and image data at the various inspection regions and/or points. In step 612, the on-board computing system 112 may use positional data and/or image sensor data to map the images into one space. In step 614 (optional in some implementations), the computing system 112 may calculate the amount of overlap between each to characterize and plot the differences in a top-down view of the aircraft 104. In step 616, if the overlap is not consistent (e.g., less than 100% overlap), then the differences may be summed with the existing 2.5D path's top-down view to generate a new 2.5D path (e.g., updated or adjusted difference path) in step 618. The new view(s) captured throughout the inspection process may also be mapped to the sparse point cloud to ensure more complete coverage in the 3D space. The new view(s) may be used to create a top-down view in which the difference points are defined at the origin of the view, as compared to the previously-calculated difference points defined on the surface of the fuselage 104. The new view(s) may be used for fine-grain adjustments and may eventually supersede most changes to the difference path made by using the overlap method of calculating the path (e.g., as in step 614-616). If, in step 616, the new difference path is evaluated to have a consistent overlap (e.g., 100% overlap) in the region of interest, this difference path is considered complete and, in step 620 of FIG. 6B, may be saved in the memory associated with the on-board computing system 112 or the remote computing system 114 as a unique path for the type of aircraft and/or as a unique path specific to that aircraft's tail number.

In some implementations, the various processes associated with creating a unique model (e.g., 3D model) may be repeated on two or more different aircraft of the same type. If, in step 622, it is determined that a difference model exists, then after each completion in step 624, an updated difference model is computed between the newly-generated difference model and the previously-saved difference model. While each difference model is a unique model, each different model may include statistical data related to one or more waypoints in the model and/or averaged data for the difference model itself. This enables the use of classical statistical analysis of the accuracy and precision of each difference model. In step 626, if the newly-calculated difference model is equal, within predetermined values, to the previous difference model, this difference model is considered stable and, in step 628, may be then saved and/or designated as the default model for that specific type of aircraft in the on-board computing system 112 and/or the remote computing system 114. If a difference model does not exist in step 622, then the difference model can be set to the unique model in step 630. In step 632, the UAV system 102 may be configured for inspecting another aircraft. If, in step 626, the two models are not equal or similar, then the most recent difference model may be stored in the memory of the UAV system 102. Control may then pass to step 632. Once a UAV system 102 is configured for another flight in step 632, control may then pass to exploration phase 602.

In some implementations, once the default path or path approach (also referred to as the default model) has been generated, implementations the path is used in various implementations of using a default path to enable the UAV system 102 to perform a damage inspection of the aircraft 104 associated with that default path. At the start of the flight, the on-board computing system 112 may utilize the current state of the UAV system 102 to calibrate the positioning system(s) of the UAV system 102 and/or to identify the aircraft 104 to be inspected. In some implementations, the computing system 112 may execute a limited exploratory phase using similar exploration methods (e.g., exploratory phase 502) previously described in this document to calibrate the positioning system(s) of the UAV system 102 and/or identify the aircraft 104 that is to be inspected. In some implementations, the computing system 112 can attempt to load a default path or select a flight path upon identifying the aircraft 104. For example, the computing system 112 can use computer vision techniques or user input (e.g., via the application 120) to identify the aircraft. In some implementations, if the on-board computing system 112 is unable to detect the type of aircraft, the UAV system 102 may rely on the data provided by the operator or may trigger a fatal error and execute a return-to-home operation. In some implementations, the navigation system may attempt to load and/or retrieve from memory a unique path for the tail number of the aircraft being inspected. This tail number may be manually input by the user. If a unique path for that specific aircraft is not found, the on-board computing system 112 may load the default path for that aircraft type. In various implementations, a unique path exists for a tail number if a previous damage inspection were halted for some reason.

Using either the unique path or default path for that aircraft type, the UAV system 102 may visit the path's waypoints in-order during a flight, the on-board computing system 112 using the path information to keep track of the waypoints that have been completed. If, during flight, the UAV system's positioning system (using the various methods disclosed in this document) detects a physical obstacle is present in the path, the path will be considered obstructed. In the event of detection of an obstructed path, the UAV system 102 may, in various implementations, enter a limited exploratory phase using the various exploration methods disclosed herein. During this limited exploratory phase, the on-board computing system 112 may characterize the physical obstacle previously observed. Following characterization, in some implementations the physical obstacle may be added to the ideal point cloud model of the aircraft 104 and the space which the obstacle occupies can be designated as a deadzone. The unique/default path may then be recalculated with this deadzone such that the UAV system 102 navigates the new path around the obstacle to enable the flight to continue while attempting to add waypoints to the edges of the deadzone that can still capture at least partial views of the surface of the aircraft 104 obstructed by the obstacle (referred to as an obstructed surface). In various implementations, the changes to the path may not be permanently made in view of the obstacle, but may only be implemented as a temporary modification during this particular inspection flight.

Where the on-board computing system detects that the obstacle is a sparse physical obstacle (e.g., scaffolding), the space associated with the obstacle may be considered a physical deadzone in various implementations to prevent attempted navigation by the UAV system into the associated space (e.g., between the supports of the scaffolding). However, in various implementations, only the actual obstacle body itself may be considered an abstract deadzone. This mixed approach for sparse physical obstacles may enable the UAV system 102 to attempt to capture multiple partial views of the aircraft surface obscured by the sparse physical obstacle in order to construct a view which meets the data collection requirements of the original waypoint which is now obstructed. The quality of the collected view may, in various implementations, be evaluated by the on-board computing system 112 in terms of a calculated overlap of the views. If the overlap value is close to a predetermined ideal overlap value (which may be set by waypoint type), then the collected view is accepted and the obstructed waypoint is marked complete by the on-board computing system 112. In some implementations, at least two, at least three, at least five, at least ten, or more images may be required to achieve the predetermined ideal overlap value. Where the predetermined ideal overlap value is not met after analysis of the overlap of the collected views, a critical error may be returned and, in various implementations, the path may be updated to treat the sparse physical obstacle as a solid physical obstacle and the waypoint may be marked as obstructed. In various implementations, the on-board computing system 112 may mark the waypoint as "skipped" and continue to navigate the UAV system 102 to the next waypoint (e.g., an unobstructed waypoint).

In various implementations, if the detected obstacle obstructs the path, multiple segments of the path's transit waypoints can be added to the path (permanently or temporarily) to allow for optimized avoidance of the obstacle without requiring data to be captured during the transit for the waypoint to be marked complete. After data is collected at any waypoint using any of the sensors 302 and the gimbal assembly 206, this data may be processed using the on-board computing system 112 using a variety of quality modules which evaluate whether the data captured at that waypoint meets various predetermined criteria. If the data meets these criteria, the on-board computing system 112 may mark that waypoint as completed in the path.

An example of such a quality module that may be used in various system and implementations is a shadow detector. The shadow detector utilizes the on-board computing system 112 to evaluate images and/or data collected by the various sensors 302 to determine, after processing using various thresholds and/or algorithms, whether a shadow is distorting the images and/or data. If shadowing is detected, the on-board computing system 112 may mark the waypoint(s) with shadowing for capture using supplemental light, leaving the waypoint(s)' status as incomplete forcing a revisit of the waypoint by the UAV system 102 during the flight or during a separate flight. In various implementations, if a revisit and reimaging using supplemental light from the UAV system 102 is again marked by the shadow detector after processing by the on-board computing system 112, the original shadowing detection was more than likely a false positive and the waypoint may be flagged for training and/or evaluation by the user in the application 120.

In various method and system implementations, a quality module can include a glare detection module. In various implementations, the on-board computing system 112 implements this module through processing two sets of data: (i) the image data set and (ii) the ambient light data set. The image data set can be determined, received, and/or derived from the image collected from the imaging sensor 108. The ambient light data set can be determined, received, and/or derived from a light sensor configured to measure ambient light. This light sensor may be included as part of the imaging sensor 108, may be a separate sensor included on the gimbal assembly 206, or may be the LiDAR sensor in various implementations. Initially, the on-board computing system 112 processes the image data set to determine whether the image data set exhibits glare as determined by various threshold values and/or algorithms. If glare is detected based on the processing, the on-board computing system 112 may mark the waypoint where the image was taken as abstractly obstructed and therefore incomplete.

In various implementations, the processing of the image data set to determine glare is configured to have a high degree of certainty since detecting glare on a generally white object such as an aircraft fuselage can be difficult. Various methods can be employed to make this determination. For example, in a particular method implementation, the on-board computing system 112 may process the ambient light data set to find areas on the aircraft fuselage 104 that have greater than average values for the surrounding ambient light. The abundance of ambient light at a particular place on the aircraft 104 marks a region which the optical camera would have the same view as the LiDAR sensor 108, marking the region as an abstract deadzone. This means that while the UAV system 102 can navigate safely through the space around the region, the optimal view from that waypoint will be obstructed to the optical camera. Greater than average light indicates a glare condition that prevents meaningful optical image capture.

In various implementations, during processing of the ambient light data set, the on-board computing system 112 may attempt to calculate the light origin (the place where the ambient light source is located) and approximate the size of the abstract deadzone caused by the particular light source. In various implementations, the light origin value is updated each time a light source is determined to be located in the same region so the deadzone size may become more accurate during a flight or during multiple flights. Following processing of the ambient light data set, any waypoint evaluated to be in the abstract deadzone is marked as abstractly obstructed. In various implementations, any waypoint in the abstract deadzone already marked as completed may then be marked as incomplete as a result of the additional processing. In various implementations, the path may be recalculated each time the abstract deadzone's boundaries are adjusted. Accordingly, system estimates and/or calculations related to abstract deadzones resulting from glare may be set conservatively to avoid unnecessary computation until sufficient data has been gathered to estimate the light origin accurately. In various implementations, the path is then adjusted by the on-board computing system 112 to capture the optimal view of the obstructed waypoints from side and/or alternate angles using the calculated light origin to shift the detected glare out of the view of the optical image sensor. In some implementations, an overlap of various partial views may be used similar to the method used to handle sparse physical objects. In such implementations, the overlap of the images and the avoidance portion of the path may be calculated and evaluated, e.g., using the percentage of the region of interest captured in two or more images or using similar methods as previously described for the overlap process.

In various implementations, the use of quality modules during a flight may cause waypoints to become incomplete in regions of the path which have already been traversed. In various implementations, these waypoints are revisited as a last set of waypoints added to the path. In various implementations, when the UAV system 102 is traveling to these potentially isolated and/or separated waypoints, the UAV system 102 may travel along the shortest calculated path. The shortest calculated path may include existing physically-unobstructed waypoints by treating each waypoint as a transit waypoint (and therefore not requiring data collection). In various situations, the likelihood of traversing across an objective waypoint that is incomplete and not abstractly obstructed when visiting this last set of waypoints is low since the method addresses the waypoints in order of distance from the final objective waypoint. The path itself, however, may vary depending on the method used to group the final set of waypoints.

In various navigation implementations, after all unobstructed waypoints have been completed, the UAV system 102 may return to home. If all obstructed waypoints have also been completed, the path can be marked as complete by the on-board computing system 112. If this is not the case, then the path is saved as a unique path in memory for use after the obstruction(s) detected during the flight are resolved. Following the completion of the path and the return-to-home process, the on-board computing system 112 may use the one or more telecommunication channels (e.g., communication module 113) to transmit the complete inspection data to the remote computing system 114. In various implementations, portions of the inspection data may have been transmitted in sections during the flight, but any remaining portions may be transmitted after the flight is completed. In some implementations, after all the inspection data has been transmitted, the aviation inspection may be marked completed by the remote computing system 114. In other implementations, the aviation inspection may be marked as complete if a minimum required set of inspection data has been transmitted to the remote computing system 114.

With the inspection data and the path map, the UAV 102 can be used by an inspector or mechanic to point out the exact location of a defect or damage. Once the UAV 102 returns to the location of the defect, the UAV 102 can illuminate the defect or damage with a light, RFID tag, paint, etc.

Data Processing Processes

As previously discussed, the remote computing system 114 may include a variety of computing devices. In some implementations, the remote computing system 114 in communication with the UAV system 102 is a cloud computing system. Accordingly, various data processing methods that involve cloud computing principles may be implemented. These will be discussed in this section.

Figure 7:
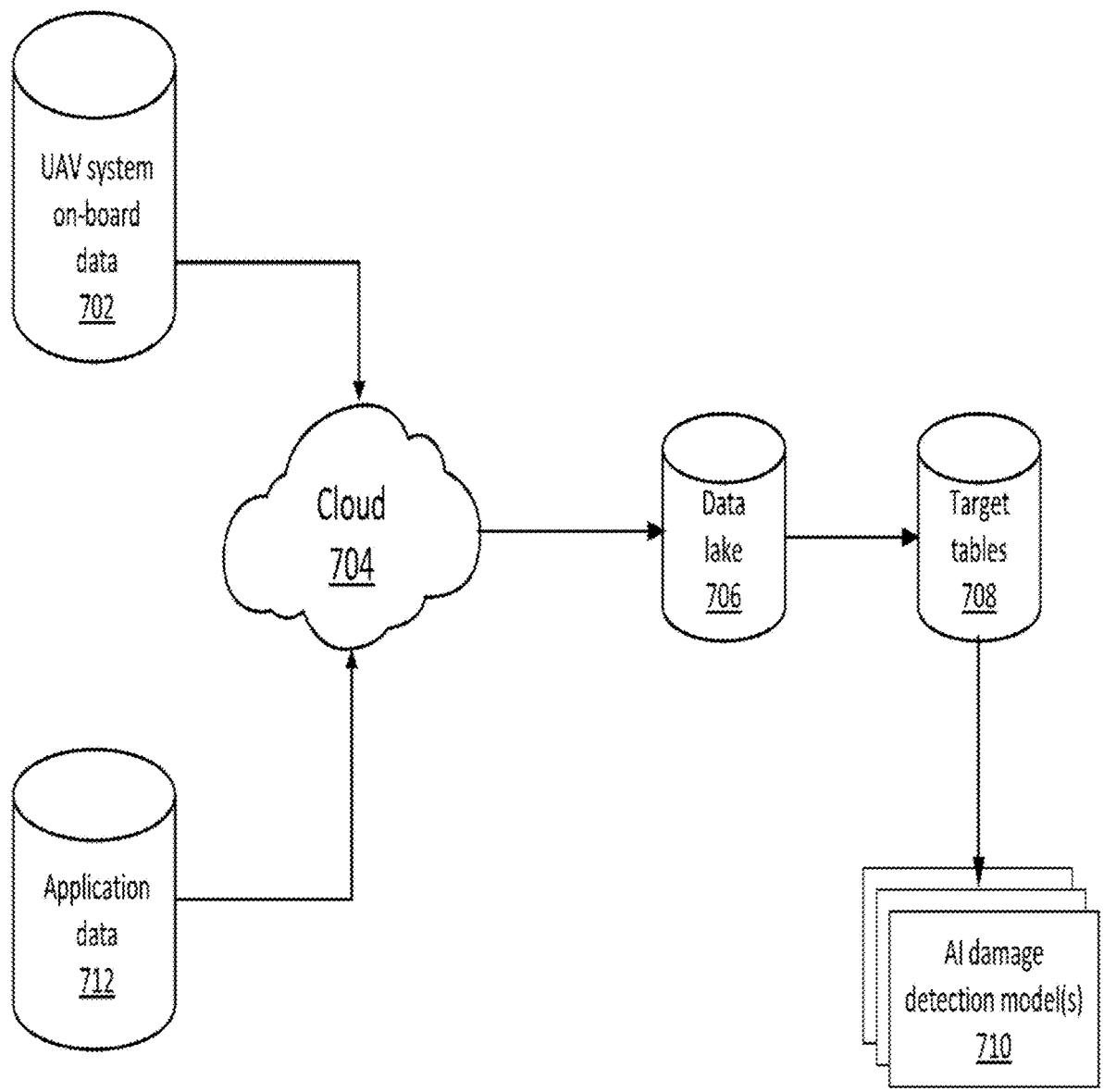
FIG. 7 is a diagram of data flow between the components of the UAV-based aviation inspection system.

FIG. 7 illustrates a block diagram of the various databases and data flow in implementations of the inspection systems and methods described herein. Various methods of ingesting data during and/or after an inspection flight may be employed by the remote computing system 114. In various implementations, pipelines may be set up within the remote computing system 114 that enable batch processing. In various implementations, the UAV system 102 utilizes Precision Time Protocol (PTP) to synchronize the LiDAR sensor 108 and the system clock used to stamp incoming camera data. This data (and optionally other data from the flight controller and diagnostic messages) may be serialized and saved into a database (e.g., an XML time-series database). In various UAV system 102 implementations, the on-board computing system 112 (e.g., the Jetson on-board computer employing an SQLite database) may compress the data files 702 to enable a much faster transfer rate (as compared to the transfer of uncompressed data files). In some implementations, once the data files 702 are compressed and/or labeled, file transferring to the cloud instance 704 (e.g., Google Cloud Platform) of the remote computing system 114 may begin. During transfer, the database may be copied to the remote computing system 114, which is configured to maintain the time synchronization of the data. In particular implementations, a "landing" compute instance may be available on the cloud instance into which files may be loaded when entering the cloud instance 704. This landing instance may be used to organize the transmitted files into separate directories according to the data they come from and/or include (e.g., according to the files' metadata or type). Once the files including the data 702 have been transferred into the cloud instance 704 and organized in directories (e.g., exclusive directories), in various implementations, the data may be ingested into a data lake 706 (e.g., by Hadoop).

In various implementations, the data lake 706 is created using many different cloud computing tools. For example, the incoming data may be organized by data type, cleaned, and/or formatted as needed for the ingestion process. In particular implementations, each data source may be ingested using a snowflake data architecture schema. Such schema can enable the storing and/or tracking of relationships between two or more data tables. Once the data is brought into the data lake 706, various system implementations may use the data storage and retrieval system (e.g., a system marketed under the tradename BIGTABLE by Google of Mountain View, Calif.) to hold the target tables 708 for analytics, data science, and/or machine learning processes in subsequent operations by the remote computing system 114.

Various data archiving methods may be employed to ensure that data is available to customers and/or users of the system on a high availability basis. In some implementations, the raw data can be processed using an extraction, transformation, and loading (ETL) that transfers the raw data to a formatted table (e.g., implemented in a Parquet format marketed under the tradename HIVE by the Apache Software Foundation of Forest Hill, Md.). This data format may facilitate the compression of data. One advantage of the Parquet-formatted table is that it is a historical table that, while taking up less space, is accessible for further research and data science. In various implementations, the various inspection images may be stored in a compressed format.

In various system implementations, most of the raw data 702 returned from the UAV system 102 may be formatted in a comma separated value (CSV) format. For example, separate CSV-formatted data may include LiDAR data, IMU data, log data, coordination data, point cloud data, etc. Various methods of data cleaning may be employed to process and clean the CSV-formatted data. In a particular implementation, the first cleaning may occur with any data to be added to a Parquet-formatted Hive table. In some implementations, it is beneficial for such data to be CSV-formatted to efficient processing. In some implementations, image data may require file name label processing if the original file name is not compatible with a predetermined and/or standardized file name format. In various implementations, ETL processes are used to collect, organize, and/or standardize the source data into the target tables 708 on the BIGTABLE instance.

In various implementations, the remote computing system 114 may employ machine learning and/or artificial intelligence modeling involving the data stored in the data lake 706. To enable this, the method may build target tables 708 that pull specific information from the data lake 706 into tables of higher specificity. This may enable more complex calculations and analysis on specific data sets and permit the remote computing system 114 to report the location and type of damage discovered on the aircraft 104 during the inspection. With the data lake approach, continuous addition of new data sources such as new inspection devices to obtain more accurate and different types of measurements can be enabled. This process is superior to the traditional data warehouse approach which does not allow for as much flexibility in the data inputs as the data lake process does. As the various data inputs are aggregated into the data lake 706, the needed target tables 708 may be constructed to feed data into the relevant machine learning/artificial intelligence model 710. Once the desired data sources, by non-limiting example, imaging sources, point cloud sources, and other raw data sources have fed data into their respective models, the remote computing system 114 can determine the averages across those results of the observed damage. This approach may provide a more accurate reading and analysis of the type and location of damage as compared to a single model approach as it allows for the contributions of multiple models to be considered by the system.

As illustrated in FIG. 1, the output of the remote computing system 114 may be transmitted to a device 118 associated with or used by a user and displayed in an interface 122 generated by the device 118. This interface 122 may be generated by an application 120 or other software program operating on the device 118 in various implementations. The interface 122 generated by the application 120 may be primarily used as a viewport into the data that has been collected and analyzed by the remote computing system 114 and/or the on-board computing system 112.

In various system and methods, however, the use of an application 120 that has a view interface 122 may provide substantial training benefit for the machine learning/artificial intelligence methods 710. Because the typical user of the device 118 viewing the data via the interface 122 may be aviation inspectors, the interface 122 can be configured to enable an inspector to manually edit the type, location, and/or size of the damage if he or she does not agree with the displayed findings generated by the remote computing system 114 and/or the on-board computing system 112. The inspector can also mark additional damage and/or damage types in addition to those identified by the remote computing system 114. After the aviation inspector has finalized the inspection (in some implementations via the interface 122 and device 118), the corrections and/or additions to the data set can be added to the data lake 706 used to train the models 710. This supervised data labeling process enables the collection of additional and more accurate data, thereby potentially improving the accuracy the models 710. This supervised feedback process may also have advantages over data set labeling techniques such as crowdsourcing because the labeled data added to the training set is identified by a domain expert and potentially peer reviewed if the domain expert is not the most qualified inspector. Because of the regulatory environment in the aviation industry, the organization labeling the data set is incentivized to provide accurate information in inspection reports. Since the training data collection platform and the organization's report generation platform are the same, the development and improvement of the machine learning/artificial intelligence methods 710 is correspondingly enhanced.

The materials used for the UAV system 102 and computing systems 112, 114 disclosed herein may be made of conventional materials used to make goods similar to those in the art, such as, by non-limiting example, metals, plastics, composites, semiconductor materials, and the like. Those of ordinary skill in the art will readily be able to select appropriate materials and manufacture these products from the disclosures provided herein.

The implementations listed here, and many others, will become readily apparent from this disclosure. From this, those of ordinary skill in the art will readily understand the versatility with which this disclosure may be applied.

User Applications for Aviation Inspection

Figure 8:
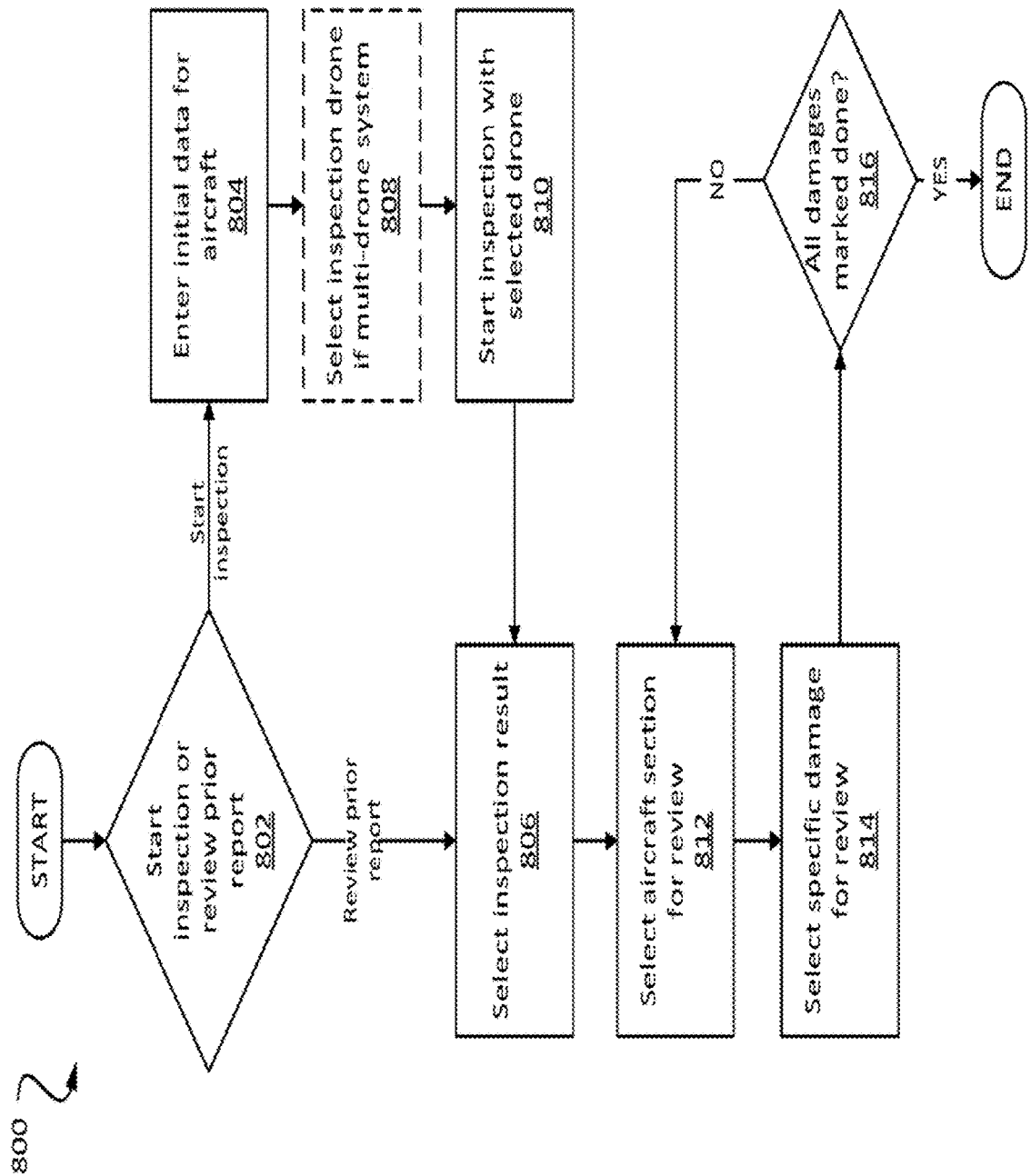
FIG. 8 is a flowchart for an application interface to enable a user to interact with the UAV system and inspection data.
Figure 9A:
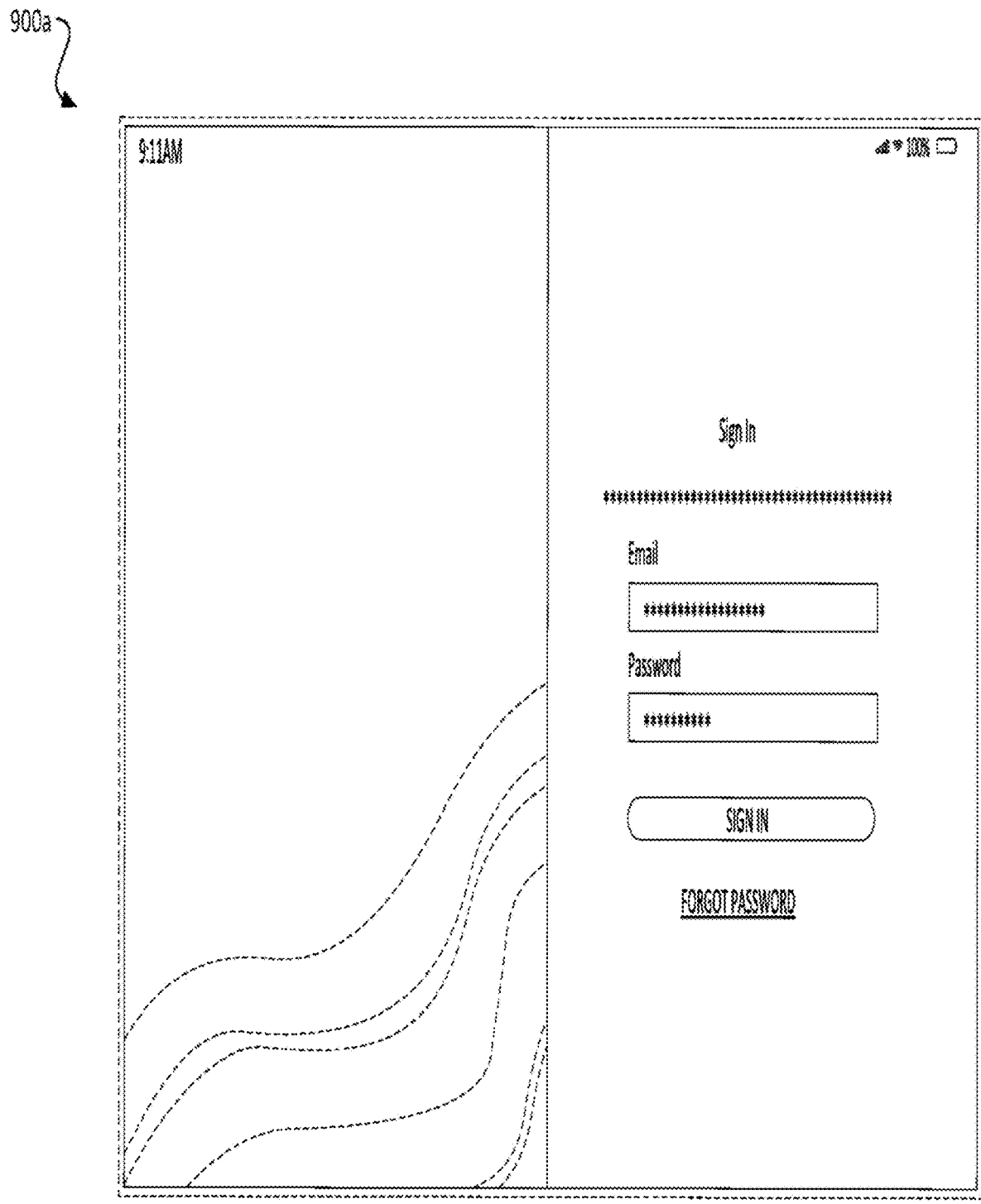
Figure 9B:
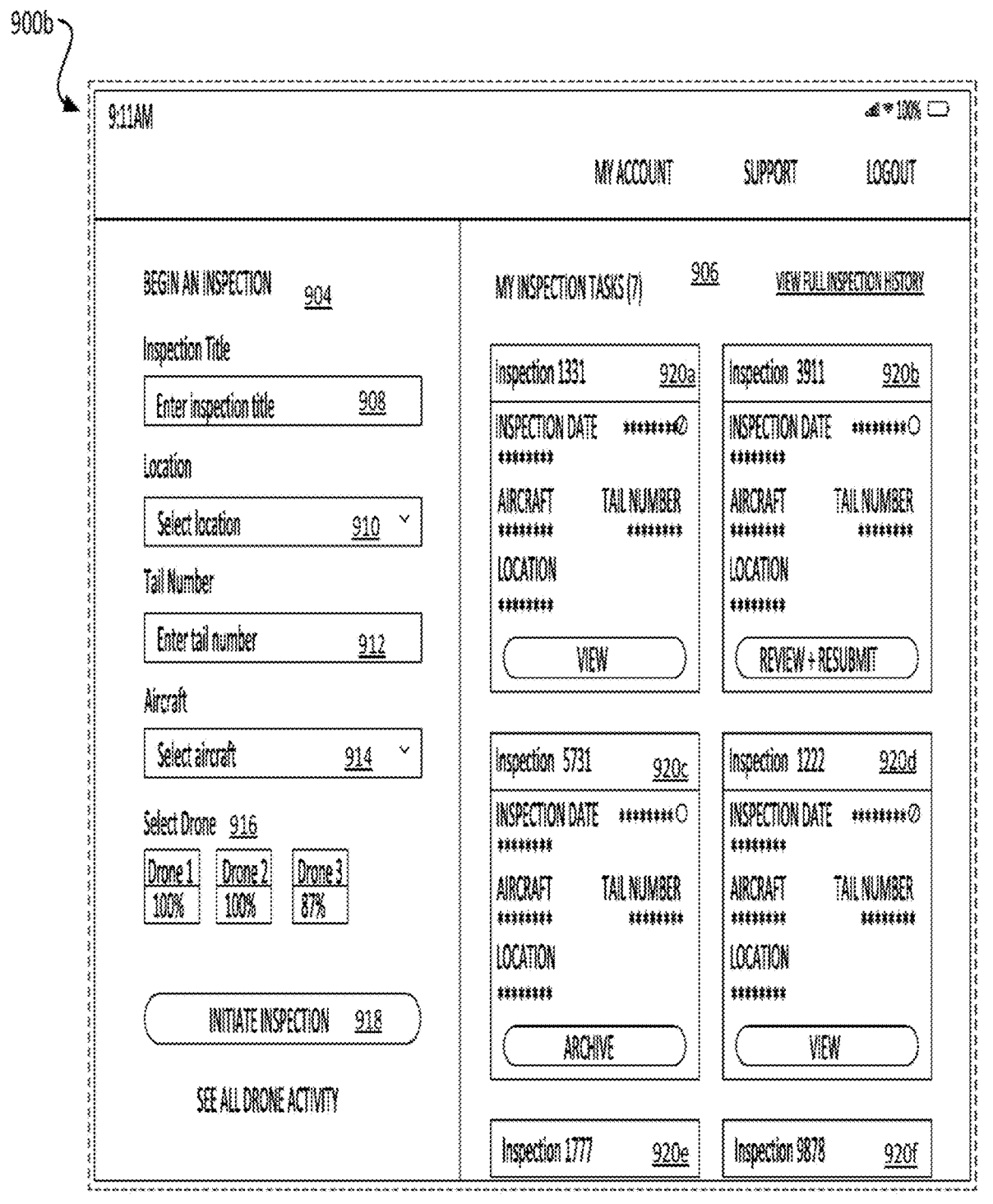
Figure 9C:
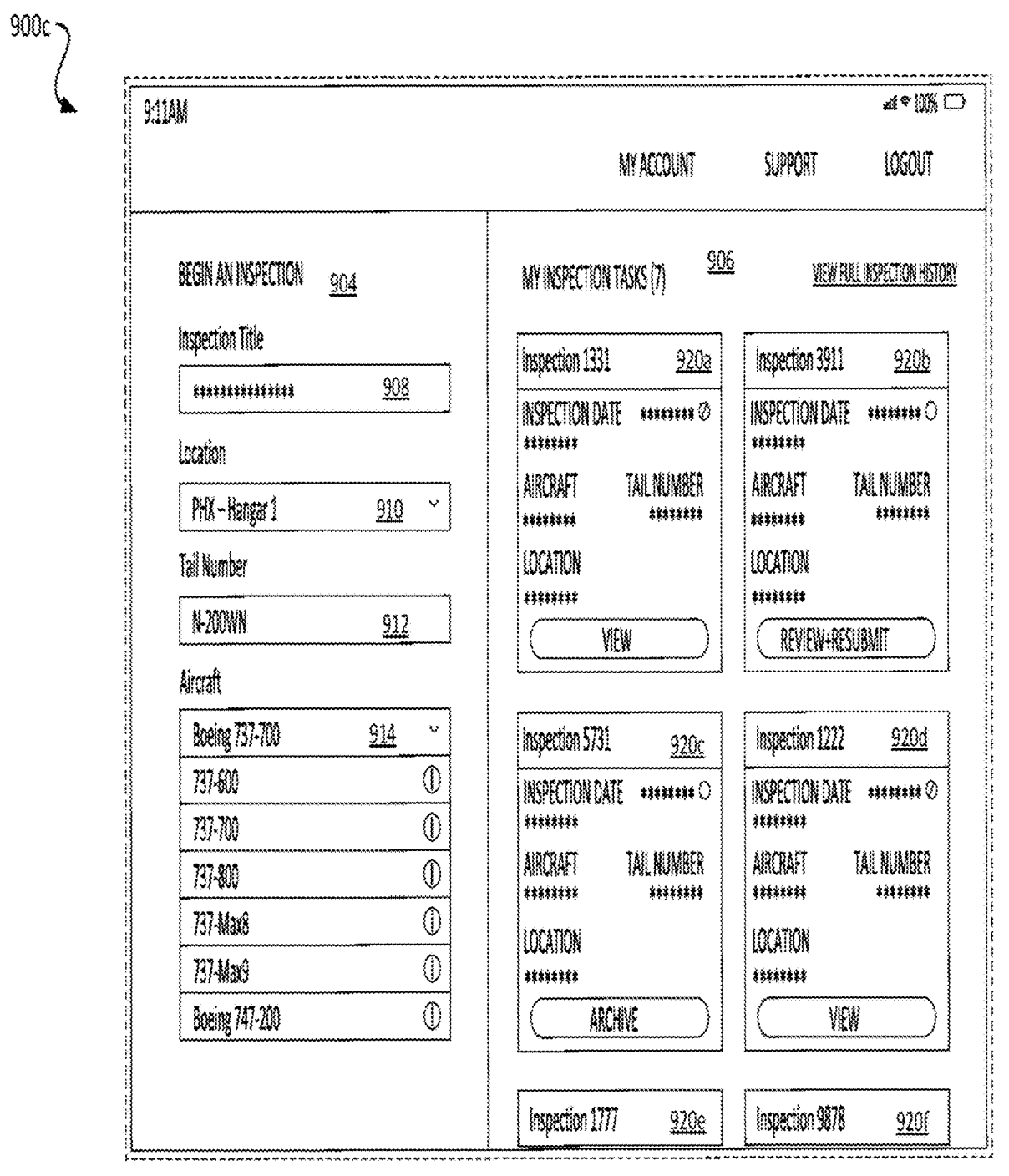
Figure 9D:
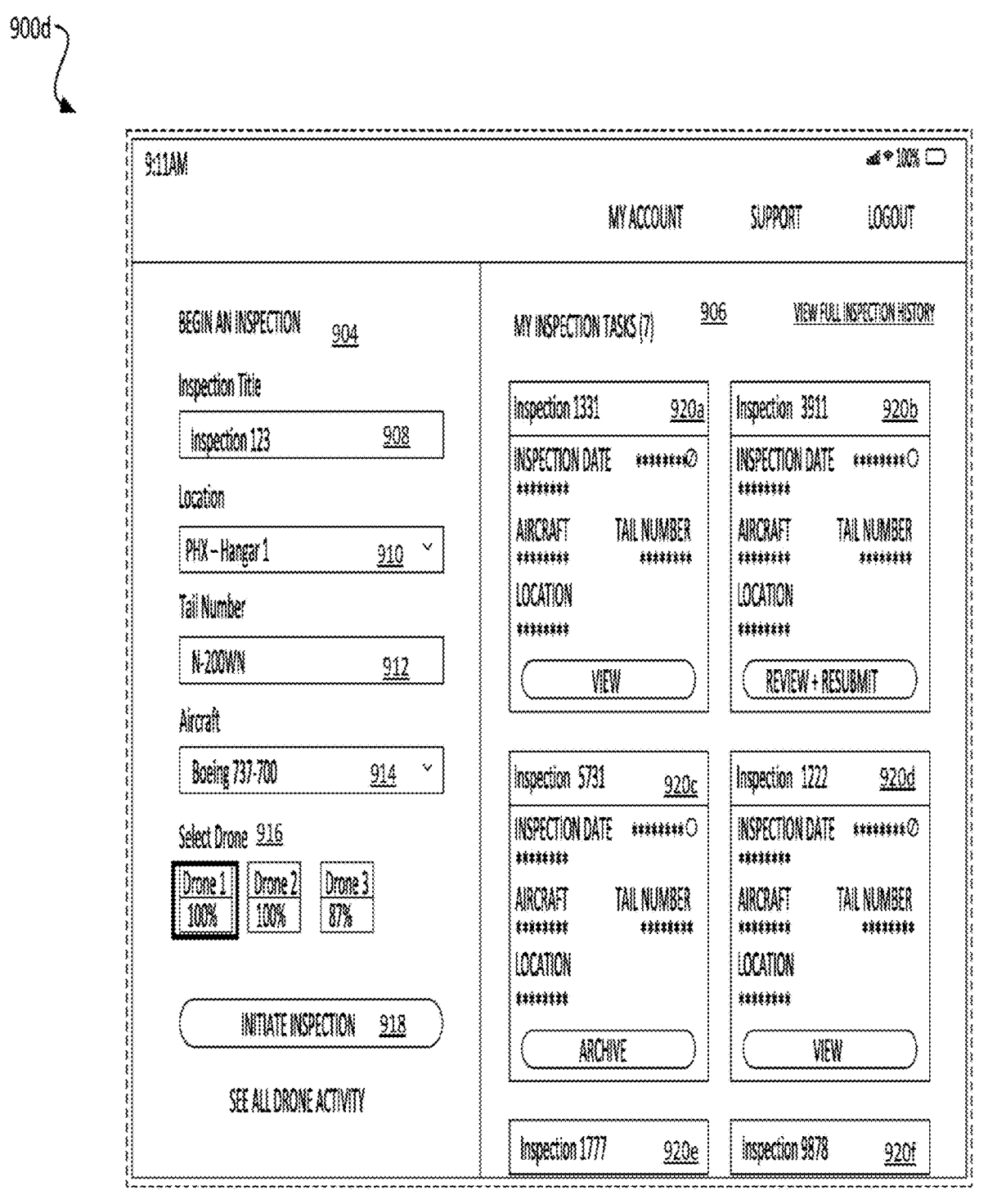
Figure 9E:
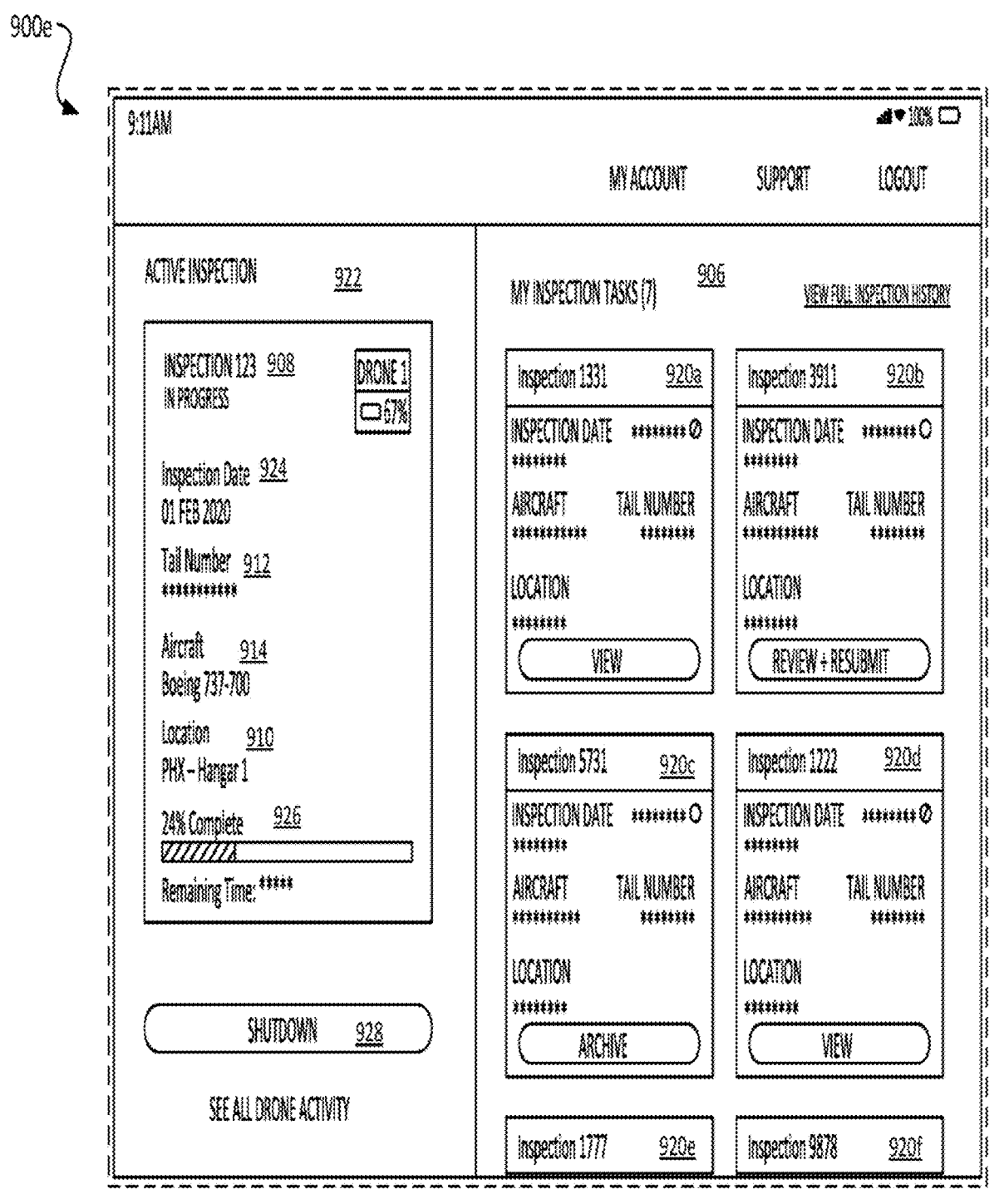
Figure 9F:
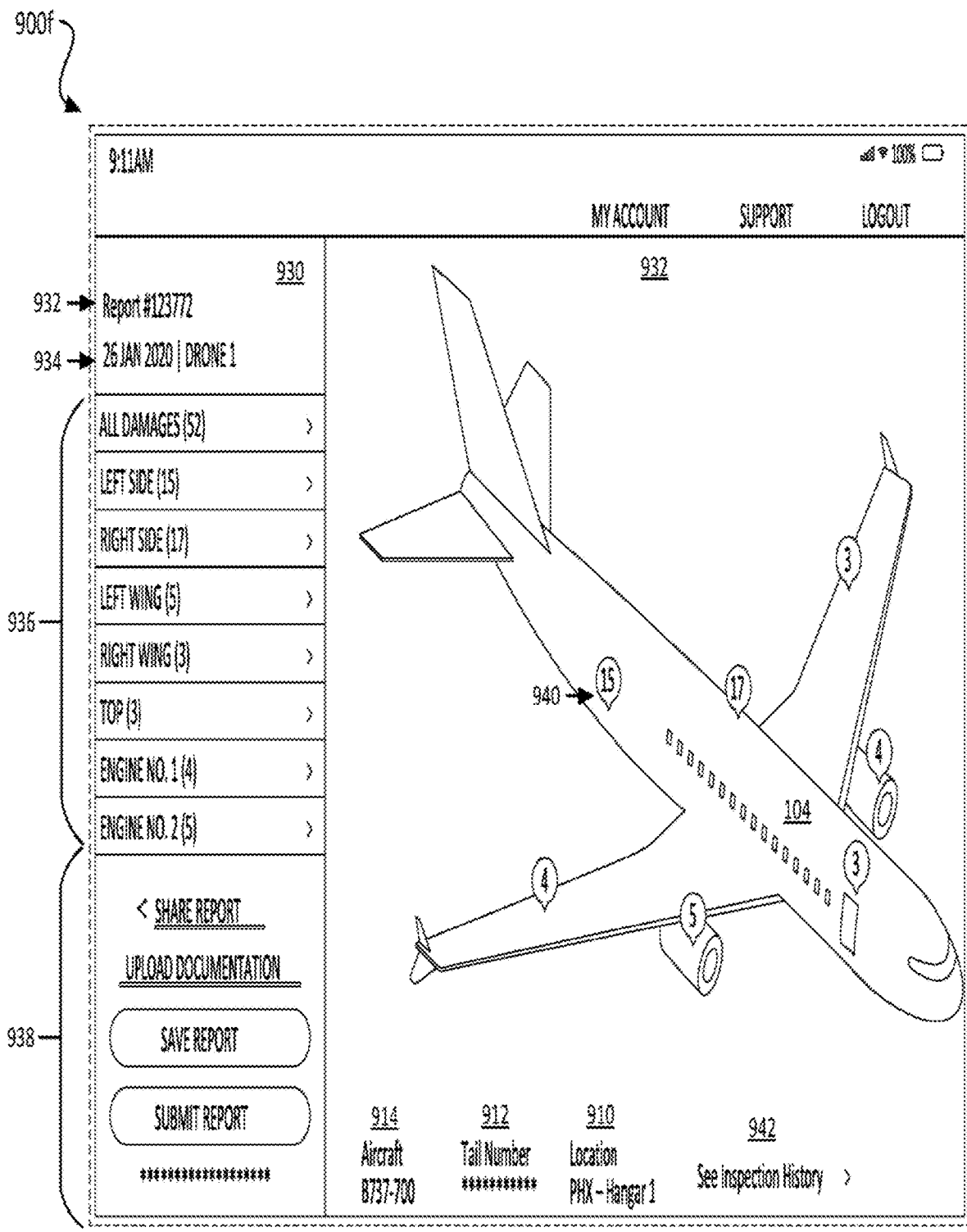
Figure 9G:
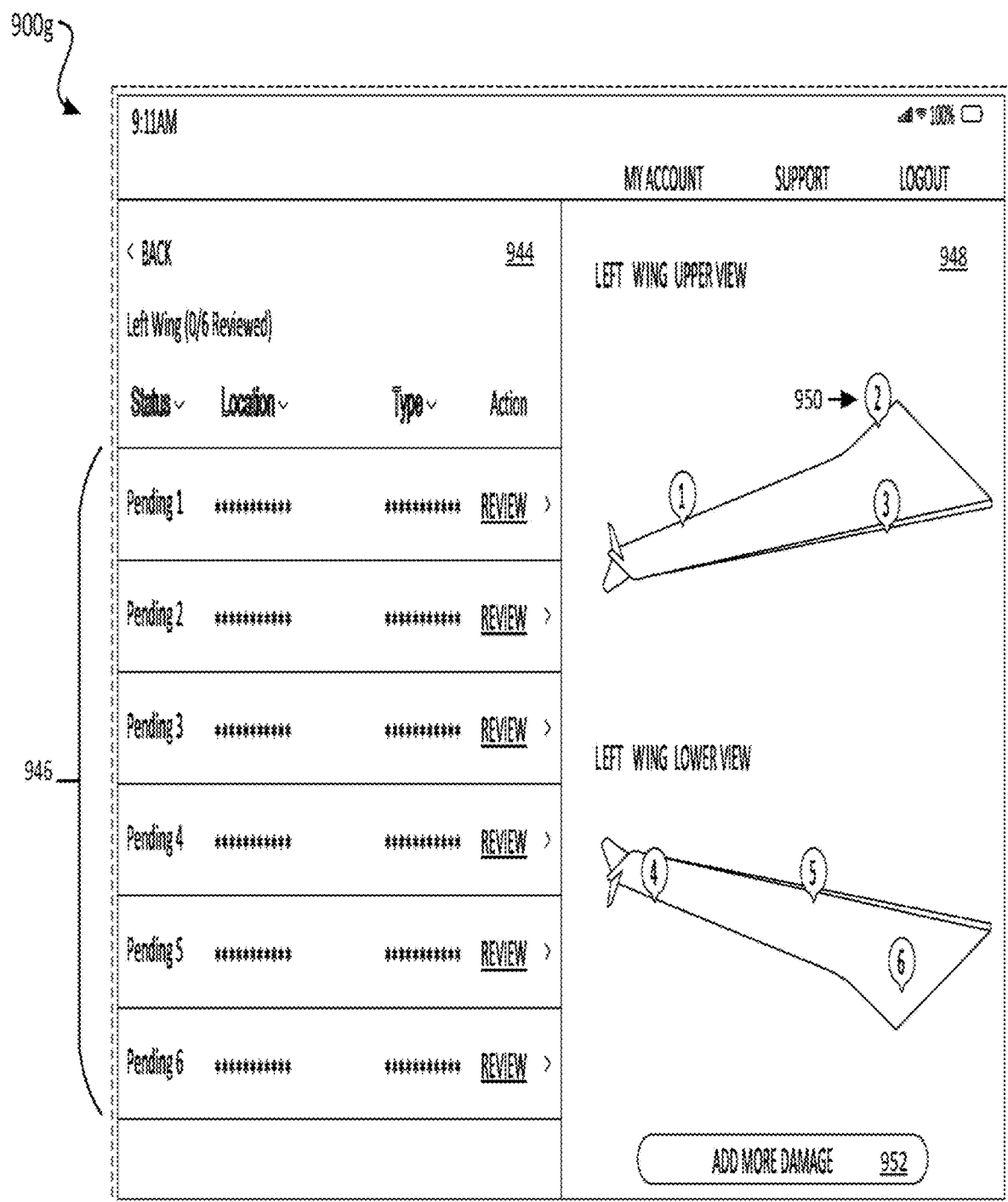
Figure 9H:
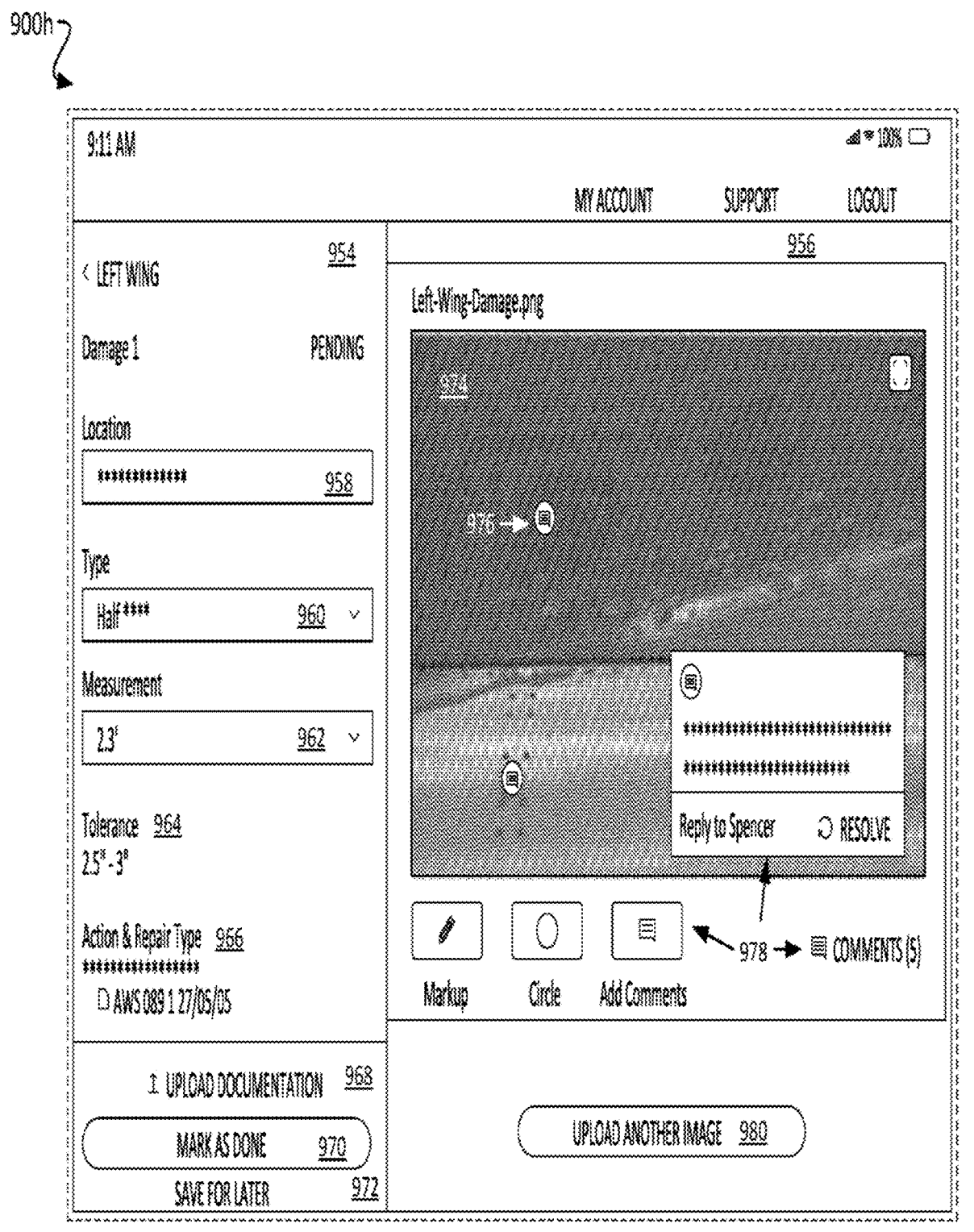

FIG. 8 illustrates a flowchart of an application interface process 800 for an example application 120 used with the inspection processes and systems described herein. FIGS. 9A-9H are exemplary user interfaces 900a-900h for application 120. For the purposes of clarity, FIGS. 8 and 9A-9H are discussed together herein below. In some implementations, the application 120 can be used for reviewing, analyzing, editing, labelling, and/or annotating collected data. For instance, the application 120 enables an inspector to view the results, including detected damage, of an aircraft inspection by the UAV system 102. The inspector may also be enabled to edit the type, location, and/or size of the damage, for example, if the inspector does not agree with the produced analysis of the on-board computing system 112 or the computing system 114.

The exemplary application 120 may include a user interface 900a to authenticate a user's credentials (e.g., user name, email address, identification number, inspection registration number, password, pass code, randomly-generated code, etc.). Such authentication may be especially beneficial in the field of aviation inspection as it is a highly regulated field with strict standards for aviation safety.

In step 802, the exemplary application 120 can provide a user interface 900b to enable a user to select to (i) start an inspection 804 (e.g., in portion 904) and/or (ii) review a prior report 806 (e.g., in portion 906). In step 804, to begin an inspection, an inspection title 908, a location 910, a tail number 912, an aircraft type 914, and/or a drone 916 may be selected in portion 904. In some implementations, the minimum selection required to begin an inspection is the aircraft type 914. In some cases, the tail number of the aircraft 104 may also be beneficial to the inspecting organization for the inspection report and therefore be selected to begin the inspection. For example, an inspection title 908 can be entered into a free text field or a drop-down field with predetermined options. In some implementations, an inspection title may be automatically assigned (e.g., a serial number).

As illustrated in exemplary interface 900c, an aircraft type 914 may be entered or selected from a drop-down field with predetermined options. These predetermined options may include aircraft types 914 for which the UAV system 102 has already executed at least one inspection, as described above. Otherwise, in some implementations, the field 914 may accept new types of aircraft. In optional step 808, the application 120 can provide one or more UAV system 102 (referred to as "drones" interfaces 900a-900h) as selectable options. As illustrated in interface 900d, one or more drones 916 may be selected based on availability, battery level, configuration, etc. For example, one drone of drone selection 916 may differ in its sensor 302 configuration as compared to another drone. For example, a second drone may include an infrared or depth estimation sensor in addition to a camera and/or LiDAR sensor while a third drone may have a camera and/or LiDAR sensor. In step 810, once one or more options are selected, the inspection may be initiated (e.g., upon selecting a button 918 to start inspection). Exemplary interface 900e illustrates a portion 922 for an active inspection following the initiation of the inspection in interface 900d. The active inspection portion 922 may include the inspection title 908, an inspection date 924, tail number 912, aircraft type 914, location 910, and/or a visual signal or text 926 to indicate the progress of the active inspection. In some implementations, the application 120 may provide an option to shut down the inspection (e.g., via button 928). To view the results of the inspection, control may pass to step 806.

In step 806, the exemplary application 120 can provide one or more inspection reports 920 for review. Exemplary portion 906 may include a listing of one or more existing reports from prior inspections. The reports listing 920a-920f (collectively referred to as reports 920) may be presented as tiles, a vertical list, or another format. In this example, each tile 920 may include the inspection title, inspection date, aircraft type, aircraft tail number, and location of the aircraft.

In step 812, the exemplary application 120 can provide an interface 900f to enable the selection of an aircraft section for review. Interface 900f may include a portion 930, which lists aircraft sections for review, and portion 932, which provides a visual representation of the aircraft sections for review. In particular, portion 930 may include a report name or number 932, an inspection date, one or more aircraft sections 936 with detected damage, and/or administrative options 938 (e.g., share report, upload documentation, save report, submit report, etc.). Aircraft sections 936 with detected damage may be represented visually relative to the overall aircraft 104 in portion 932. For example, the detected damage to sections 936 may be represented with flags 940 or another type of indicator near the corresponding aircraft section.

For example, the right side of the aircraft may have 15 instances of detected damage. This may be represented in text 936 and/or as a visual indicator 940. Portion 932 may include other types of information, e.g., aircraft type, tail number, and/or location. Portion 932 may also include an option to review inspection history 942 related to this aircraft. In interface 900f, the user may be able to select an aircraft section for review via text 936 or visual indicator 940 to review the specific damage.

In step 814, the exemplary application 120 can enable the review of specific damage to an aircraft section in interface 9006. Interface 900g may include a portion 944, which lists the detected damage instances 946, and a portion 948, which provides visual representations of the detected damage instances 946. For example, for each damage instance 946, the portion 944 can include the status, location, type, and/or available action (e.g., review). Portion 948 can include damage instances represented as flags 950. In some implementations, the inspector is enabled to add other instances of damage (e.g., via button 952) in portion 944. By clicking on "REVIEW" in portion 944, the application 920 can provide detailed damage information in interface 900h. Interface 900h may include portion 954, which includes one or more fields with specific information about the damage, and portion 956, which includes one or more captured images by the UAV system 102. In particular, portion 954 may include the specific location 958 of the damage, the damage type 960, the damage measurement 962, a tolerance 964 for the measurement 962, an action type 966, an option 968 to upload documentation, an option 970 to mark completion of review, and/or save option 972. Portion 956 may include one or more images 974 associated with the detected damage characterized in portion 954, visual indicators 976 for specific damage, one or more edit or comment options 978 (e.g., mark up, circle, add comments, review comments, reply to another user, resolve flagged damage, etc.), and/or an option 980 to upload another image. In some implementations, the inspector is enabled to edit the damage instance details in portion 954.

In step 816, if detected damages are marked done or completed by the user of the application 120, the process may end with a saved or submitted inspection report. This report may appear in the listing of portion 906. If the damages are not marked done, then control may pass to step 812, in which the user can select another aircraft section for review until, for instance, all aircraft sections having detected damage are marked done or completed.

In various implementations, the edits or changes to damage data by an inspector via the application 120 may be provided to the machine learning model 710 for training purposes (e.g., to improve damage detection by the UAV system 102). In some implementations, training of the model 710 may incorporate "human-in-the-loop" (HITL) AI techniques.

Exemplary Processes for Aviation Inspection

Figure 10:
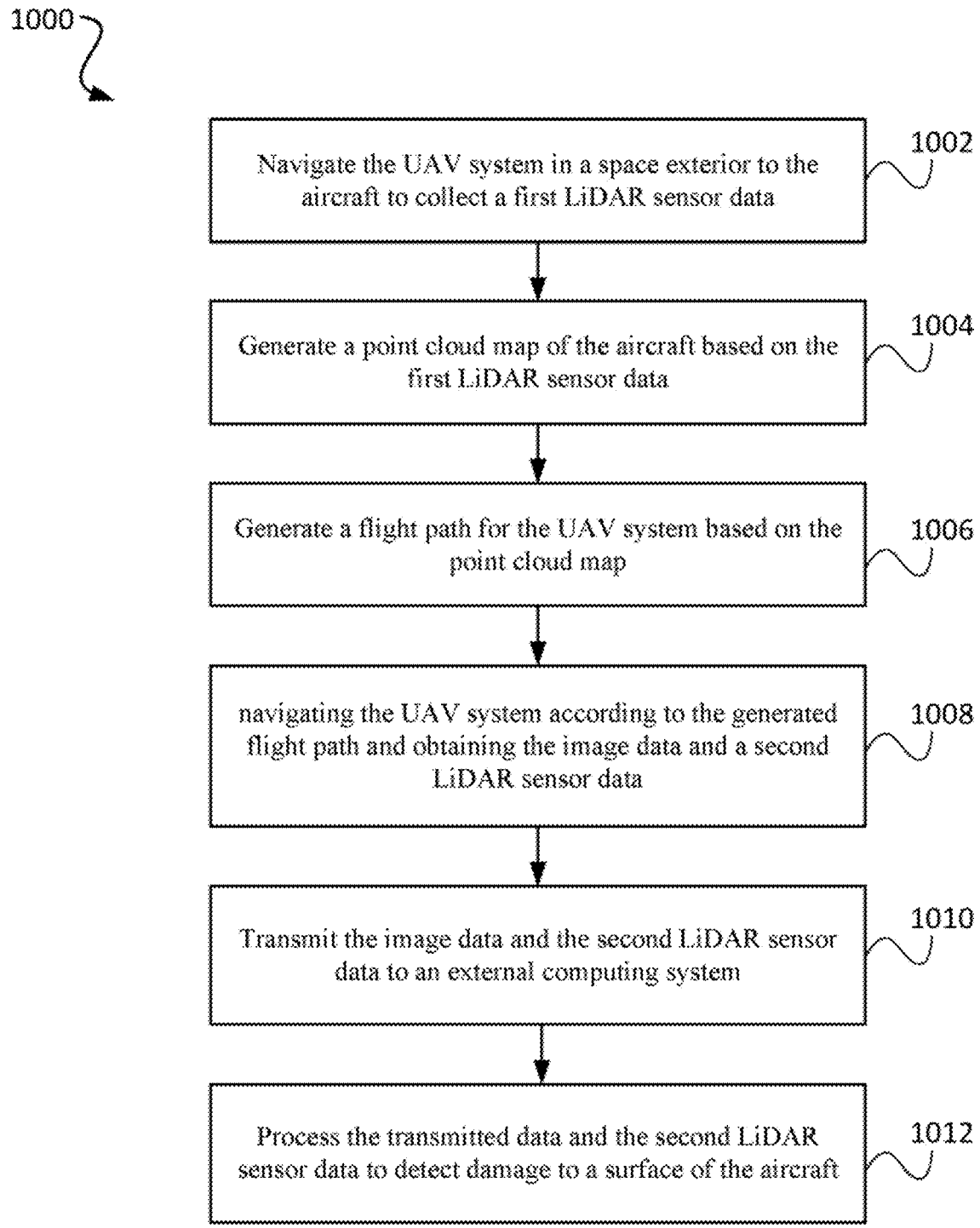
FIG. 10 is a flowchart of an exemplary method for inspecting an aircraft.

Exemplary methods for inspecting aircraft 104 may include one or more aspects of the methods described herein. FIG. 10 illustrates an exemplary method for inspecting aircraft 104 in a global positioning system (GPS) denied environment using the present an unmanned aerial vehicle (UAV) system. The exemplary UAV system 102 may include (i) at least one camera, (ii) a light detection and ranging (LiDAR) sensor 108, (iii) a computing system (112 or 114) coupled to the camera and the LiDAR sensor 108, and (iv) a controller 110 configured to navigate the UAV. The exemplary UAV system 102 may include any one or more of the features described herein. In step 1002, the inspection method may include navigating the UAV system 102, via the controller, in a space exterior to the aircraft to collect a first LiDAR sensor data. In step 1004, the computing system may generate a point cloud map of the aircraft based on the first LiDAR sensor data.

In step 1006, the computing system may generate a flight path for the UAV system 102 based on the point cloud map. The generated flight path may be unique to a type of the aircraft 104 or to the tail number of the aircraft 104. In some implementations, the computing system 112 may detect (e.g., via camera, LiDAR, other sensor, or analysis of the point cloud map) the type of the aircraft 104 to generate the flight path.

The flight path may include multiple waypoints at which the UAV system 102 is configured to obtain image data and a second LiDAR sensor data. The waypoints may be arranged in a sequence such that the UAV system 102 traverses the waypoints serially in the sequence. Each waypoint may be associated with a predetermined position of the UAV system relative to the aircraft and a predetermined attitude of the UAV system. Each waypoint may be associated with a particular camera view for the camera.

In step 1008, the controller 110 may navigate the UAV system 102 according to the generated flight path and obtaining the image data and a second LiDAR sensor data for at least a subset of the plurality of waypoints. In optional step 1010, the computing system may transmit to an external computing system (e.g., system 114) the image data and the second LiDAR sensor data. In step 1012, the computing system 112 or the external computing system 114 may process the transmitted data and the second LiDAR sensor data to detect damage to a surface, subsurface, or interior surface of the aircraft 104 for the subset of the waypoints.

The inspection of the aircraft 104 may be complete when the UAV system 104 collects image data and LiDAR sensor data for all of the waypoints (e.g., the planned waypoints). In some implementations, the computing system 112 may detect (e.g., via camera, LiDAR, or other sensor) a condition to stop inspection on the flight path. If so, the controller 110 may navigate the UAV system 102 to a different position upon detecting the condition. The detected condition may be one or more of (i) an obstacle due to a static object, (ii) an obstacle due to a dynamic object, (iii) a hardware malfunction, or (iv) software malfunction. The different position may be a starting position of the flight path. The different position may be a landing position.

In some implementations, the controller 110 may navigate the UAV system 102 according to the generated flight path to inspect a different aircraft of a same type as the aircraft. The computing system 112 may determine whether a different path is required to detect damage on the different aircraft. If a different path is not required, the computing system 112 may designate the generated flight path as the default path for the aircraft type. If a different path is required, the computing system 112 may store (e.g., in a coupled memory) the different path as the unique path for the aircraft type.

In some implementations, the computing system 112 or 114 may transmit the processed data to a user device 118 for review in an interface 122 of the device 118. The processed data may indicate whether damage to the aircraft 104 was detected for at least the subset of the waypoints. The computing system 112 or 114 may receive review data indicating a confirmation or a denial of the detected damage for at least one of the waypoints. The computing system 112 or 114 may determine an alternative flight path for subsequent inspections of the aircraft 104 based on the received review data. In some implementation, a predictive model (e.g., a machine learning model, AI model, etc.) to detect damage on aircraft 104 based on at least one of the processed data or the received review data. In some embodiments, the predictive model is a logistical regression model. Alternatively, the predictive model may be a classifier (e.g., a decision tree, a random forest of decision trees, an artificial neural network, a support vector machine, a Bayesian network, etc.). Any suitable techniques (e.g., predictive modeling processes, machine learning processes, etc.) may be used to fit the predictive model to the data and/or to tune (e.g., optimize) the model, including but not limited to cross-validation and hyper-parameter tuning. The computing system 112 or 114 may process the collected data by inputting the data into a trained predictive model to detect damage to the aircraft 104. The computing system 112 may be configured to detect a glare or shadow on the surface of the aircraft associated with a particular waypoint. The flight path may be altered accordingly to obtain a different set of image data and LiDAR sensor data.

Hardware and Software Implementations

Figure 11:
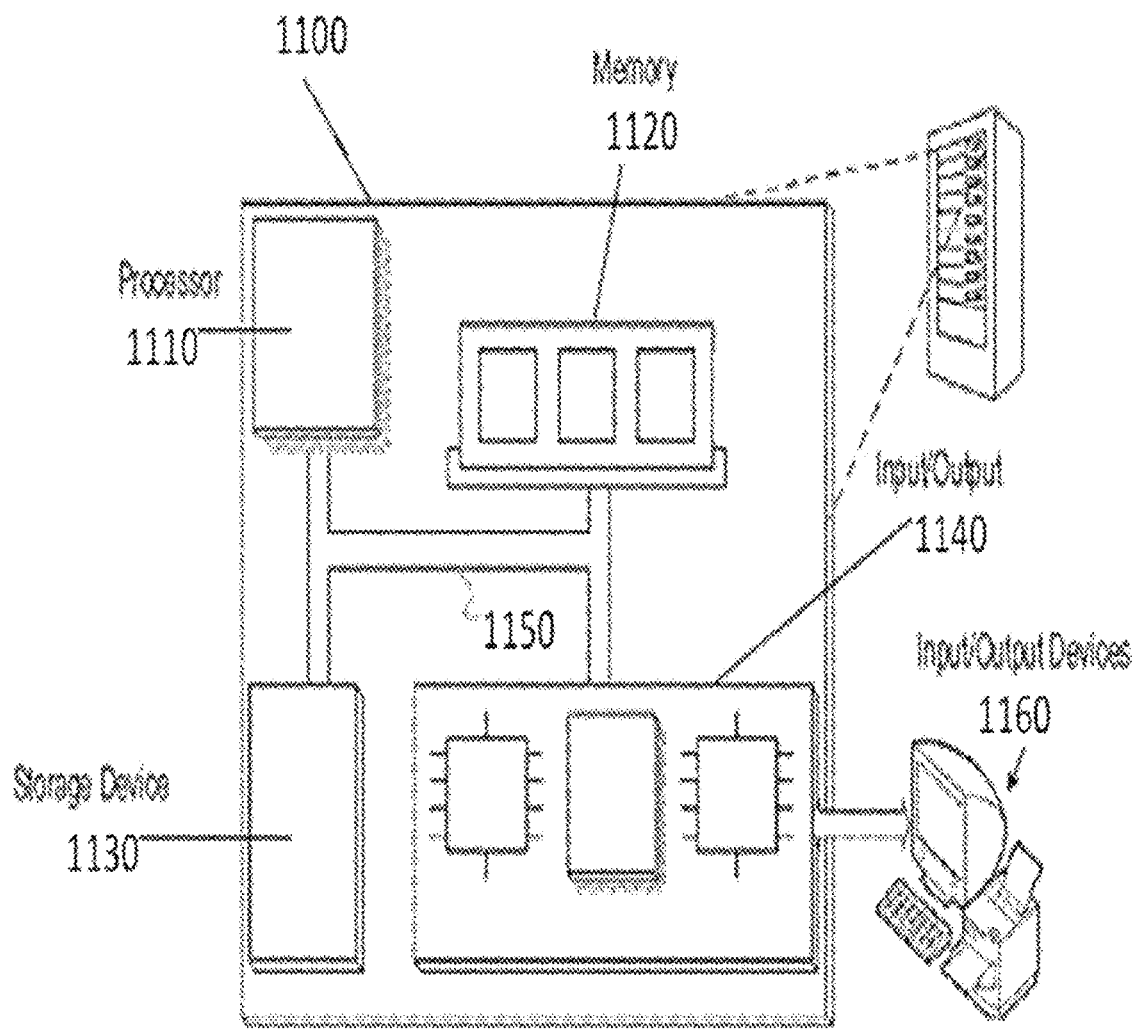
FIG. 11 is a diagram of an exemplary hardware and software systems implementing the systems and methods described herein.

FIG. 11 is a block diagram of an example computer system 1100 that may be used in implementing the technology described in this document. General-purpose computers, network appliances, mobile devices, or other electronic systems may also include at least portions of the system 1100. The system 1100 includes a processor 1110, a memory 1120, a storage device 1130, and an input/output device 1140. Each of the components 1110, 1120, 1130, and 1140 may be interconnected, for example, using a system bus 1150. The processor 1110 is capable of processing instructions for execution within the system 1100. In some implementations, the processor 1110 is a single-threaded processor. In some implementations, the processor 1110 is a multi-threaded processor. The processor 1110 is capable of processing instructions stored in the memory 1120 or on the storage device 1130.

The memory 1120 stores information within the system 1100. In some implementations, the memory 1120 is a non-transitory computer-readable medium. In some implementations, the memory 1120 is a volatile memory unit. In some implementations, the memory 1120 is a nonvolatile memory unit.

The storage device 1130 is capable of providing mass storage for the system 1100. In some implementations, the storage device 1130 is a non-transitory computer-readable medium. In various different implementations, the storage device 1130 may include, for example, a hard disk device, an optical disk device, a solid-date drive, a flash drive, or some other large capacity storage device. For example, the storage device may store long-term data (e.g., database data, file system data, etc.). The input/output device 1140 provides input/output operations for the system 1100. In some implementations, the input/output device 1140 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1160. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1130 may be implemented in a distributed way over a network, for example as a server farm or a set of widely distributed servers, or may be implemented in a single computing device.

Although an example processing system has been described in FIG. 11, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system, comprising:
   an unmanned aerial vehicle (UAV);
   a computing system configured to establish a coordinate system in a space exterior to an aircraft in a global positioning system (GPS) denied environment;
   a controller configured to navigate the UAV along a flight path proximate to a surface of the aircraft according to the established coordinate system;
   a camera configured to obtain image data; and
   a light detection and ranging (LiDAR) sensor configured to obtain LiDAR sensor data of an inspection location on the surface to determine a presence of damage, wherein the aircraft is designated as an origin for the coordinate system.

2. The system of claim 1, wherein the camera and the LiDAR sensor are disposed on a gimbal assembly configured to rotate independently from the UAV.

3. The system of claim 2, wherein the gimbal assembly is configured to rotate about two axes, each axis of rotation controlled by an independent motor.

4. The system of claim 1, further comprising at least one of: an infrared camera, a white light sensor, a depth sensor, a stereoscopic camera, or a thermal sensor.

5. The system of claim 1, wherein the computing system is configured to transmit obtained image data and the LiDAR sensor data to an external computing system for processing to generate processed data.

6. The system of claim 5, wherein the processed data from the external computing system is transmitted to an application instance executing on a user device.

7. The system of claim 5, wherein the obtained image data and the LiDAR sensor data are inputted to a predictive model to detect damage to the aircraft.

8. The system of claim 1, wherein the computing system is configured to process the LiDAR sensor data to generate a view for a point cloud map around the aircraft.

9. The system of claim 8, wherein the computing system is configured to process the view of the point cloud map to:
   determine a position of an object near the aircraft; and
   incorporate the position of the object into the coordinate system.

10. The system of claim 9, wherein the LiDAR sensor data is updated to generate a different view for the point cloud map.

11. The system of claim 10, wherein the computing system is configured to compare the different view to the view to determine whether the object is a dynamic object.

12. The system of claim 11, wherein the computing system is configured to process the comparison between the different view and the view to determine a velocity of the dynamic object.

13. The system of claim 10, wherein the computing system is configured to compare (a) the comparison between the different view and the view to (b) at least one of: output data of an inertial measurement unit (IMU) or a flight path of the UAV to determine whether the UAV is off the flight path.

14. The system of claim 9, wherein the computing system is configured to determine a probability that the object is a dynamic object.

15. The system of claim 1, wherein the computing system comprises a glare detector module configured to process at least one of the image data, the LiDAR sensor data, or ambient light data to determine a presence of a glare on the inspection location.

16. The system of claim 15, wherein, if the presence of the glare is detected on the inspection location, the computing system may alter the flight path to obtain at least one different set of image data and LiDAR sensor data, and wherein each different set of image data and LiDAR sensor data is obtained through a different view of the inspection surface.

17. The system of claim 16, wherein at least two different sets of image data and the LiDAR sensor data are obtained, and wherein a first set of the at least two different sets of image data is compared to a second set of the at least two different sets of image data to determine a presence of damage in the inspection location obscured by the glare.

18. A system, comprising:

an unmanned aerial vehicle (UAV);

a computing system configured to establish a coordinate system in a space exterior to an aircraft in a global positioning system (GPS) denied environment;

a controller configured to navigate the UAV along a flight path proximate to a surface of the aircraft according to the established coordinate system;

a camera configured to obtain image data; and a light detection and ranging (LiDAR) sensor configured to obtain LiDAR sensor data of an inspection location on the surface to determine a presence of damage, wherein the computing system comprises a shadow detector module configured to process at least one of the image data or the LiDAR sensor data to determine a presence of a shadow on the inspection location.

19. The system of claim 18, wherein the UAV is coupled to a light source configured to illuminate a location of the inspection location.

20. A system, comprising:

an unmanned aerial vehicle (UAV);

a computing system configured to establish a coordinate system in a space exterior to an aircraft in a global positioning system (GPS) denied environment;

a controller configured to navigate the UAV along a flight path proximate to a surface of the aircraft according to the established coordinate system;

a camera configured to obtain image data; and a light detection and ranging (LiDAR) sensor configured to obtain LiDAR sensor data of an inspection location on the surface to determine a presence of damage, wherein the obtained image data and the LiDAR sensor data are inputted to a predictive model to detect damage to the aircraft.

* * * * *